US012799279B2

(12) United States Patent
Akimoto et al.

(10) Patent No.: US 12,799,279 B2
(45) Date of Patent: Nov. 17, 2026

(54) PRODUCTION METHOD FOR POLYSILOXANE, COMPOSITION INCLUDING POLYSILOXANE, AND MOLDED BODY

(71) Applicant: MITSUBISHI GAS CHEMICAL COMPANY, INC., Tokyo (JP)

(72) Inventors: Hisato Akimoto, Tokyo (JP); Kohei Kamatani, Tokyo (JP); Daisuke Taguchi, Tokyo (JP); Kazuyoshi Uera, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 804 days.

(21) Appl. No.: 18/027,171

(22) PCT Filed: Sep. 22, 2021

(86) PCT No.: PCT/JP2021/034681
§ 371 (c)(1),
(2) Date: Mar. 20, 2023

(87) PCT Pub. No.: WO2022/065331
PCT Pub. Date: Mar. 31, 2022

(65) Prior Publication Data
US 2023/0357511 A1 Nov. 9, 2023

(30) Foreign Application Priority Data
Sep. 23, 2020 (JP) ................................ 2020-158566

(51) Int. Cl.
*C08G 77/18* (2006.01)
*C08G 77/08* (2006.01)
(Continued)

(52) U.S. Cl.
CPC ............. *C08G 77/18* (2013.01); *C08G 77/08* (2013.01); *C08L 83/06* (2013.01); *G02B 1/041* (2013.01)

(58) Field of Classification Search
CPC ..................................................... C08G 77/18
See application file for complete search history.

(56) References Cited

U.S. PATENT DOCUMENTS 5,633,332 A 5/1997 Land et al.
6,407,193 B1 * 6/2002 Hiiro .................... C08G 64/186 528/25

(Continued)

FOREIGN PATENT DOCUMENTS

EP 1 035 150 A1 9/2000
EP 3 943 525 A1 1/2022

(Continued)

OTHER PUBLICATIONS

Supplementary European Search Report dated Mar. 1, 2024 in family member European patent application No. 21872460.7.

(Continued)

*Primary Examiner* — Michael F Pepitone
(74) *Attorney, Agent, or Firm* — GREENBLUM & BERNSTEIN, P.L.C.

(57) ABSTRACT

The present invention provides, for example, a method for efficiently producing a polysiloxane having a siloxane constituent unit while making it possible to improve safety and reduce environmental burden. The above-mentioned problem is solved by a method comprising a polymerization step of polymerizing a silane-based compound and a diol compound in the presence of a transesterification catalyst including at least a phosphorus compound, in which the silane-based compound is selected from a specific diaryloxysilane compound, a specific dialkoxysilane compound, and a specific silicon compound, and in the polymerization step, a polysiloxane having a siloxane constituent unit represented by any of formula (1-1) to formula (1-4) is produced. (In the formulas, $R^1$-$R^{10}$, $R^{30}$-$R^{33}$, $Z_1$, $Z_2$, $J_1$, $K_1$, $A_1$, $A_2$, $L_1$, $L_2$, and X are as described in the description of the present application.)

(Continued)

(1-1)

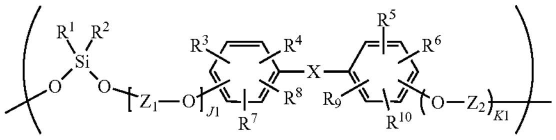

(1-2)

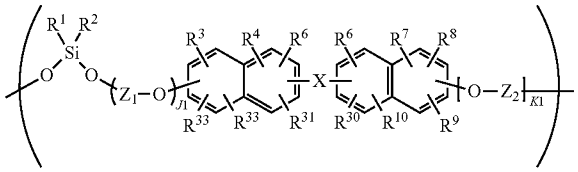

(1-3)

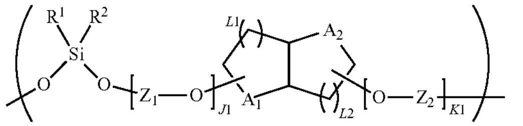

(1-4)

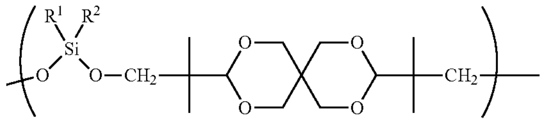

19 Claims, 1 Drawing Sheet

(51) Int. Cl.

| | |
|---|---|
| ***C08L 83/06*** | (2006.01) |
| ***G02B 1/04*** | (2006.01) |

(56) References Cited

U.S. PATENT DOCUMENTS

| | | | | |
|---|---|---|---|---|
| 6,476,249 | B1 * | 11/2002 | Ito .......................... | C08G 64/30<br>528/271 |
| 12,240,978 | B2 * | 3/2025 | Uera ...................... | C08G 77/60 |
| 12,325,796 | B2 * | 6/2025 | Uera .................... | C08G 64/307 |
| 2002/0188091 | A1 | 12/2002 | Hucks et al. | |
| 2022/0033655 | A1 | 2/2022 | Uera et al. | |

FOREIGN PATENT DOCUMENTS

| | | | |
|---|---|---|---|
| JP | 3-217495 | A | 9/1991 |
| JP | 8-502537 | A | 3/1996 |
| JP | 2008-519097 | A | 6/2008 |
| JP | 2012-140632 | A | 7/2012 |
| JP | 2015-512999 | A | 4/2015 |
| WO | 2006/049987 | A1 | 5/2006 |
| WO | 2013/155046 | A1 | 10/2013 |
| WO | 2020/196343 | A1 | 10/2020 |

OTHER PUBLICATIONS

"New Type Plastics, Process, and Formulation", China Light Industry Press Ltd., vol. 1, p. 249, published on Jan. 31, 2000.

Pacansky et al., "Synthesis and Thermomechanical Properties of Alternating Copolymers Containing Bisphenol-A", Journal of Polymer Science, vol. 18, 1980, pp. 3119-3127.

International Search Report issued Dec. 7, 2021 in International Bureau of WIPO Patent Application No. PCT/JP2021/034681, along with an English translation thereof.

Written Opinion issued Dec. 7, 2021 in International Bureau of WIPO Patent Application No. PCT/JP2021/034681, along with an English translation thereof.

Office Action, dated Dec. 4, 2024, in Chinese family member patent application No. 202180064531.5 with an English language translation thereof.

* cited by examiner

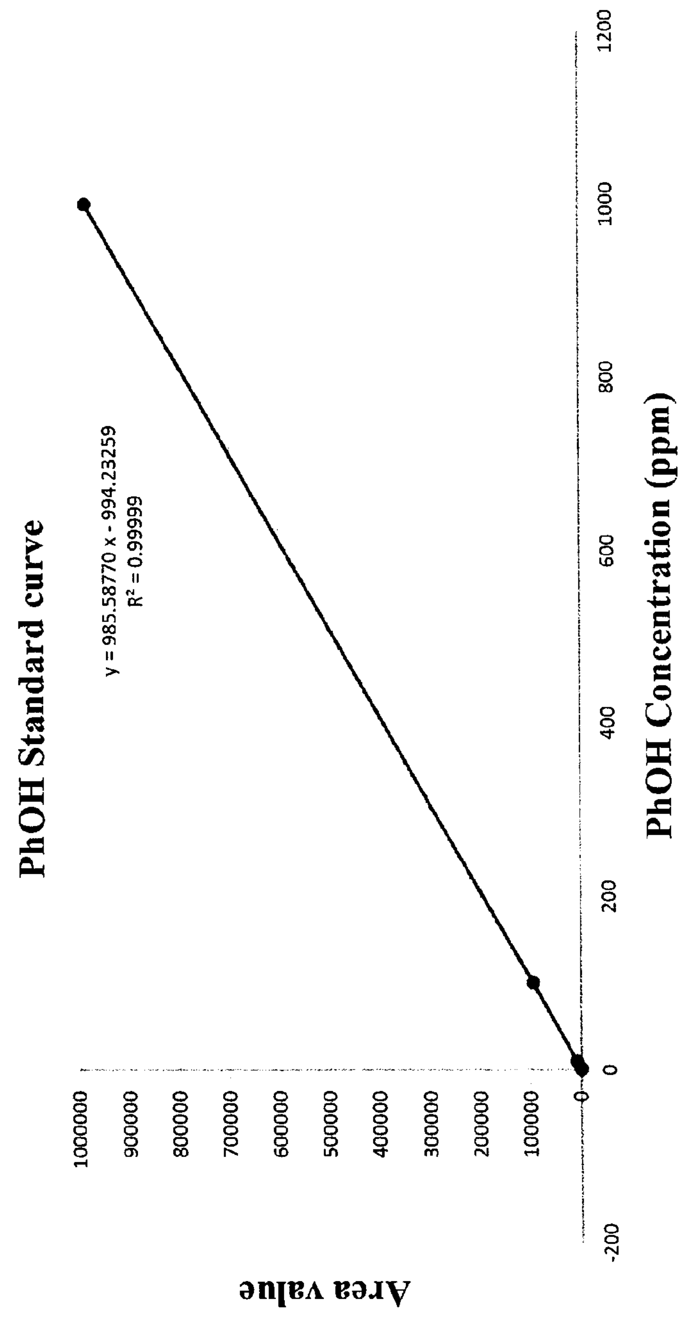
PhOH Standard curve
y = 985.58770 x - 994.23259
R² = 0.99999
Area value
1000000
900000
800000
700000
600000
500000
400000
300000
200000
100000
0
-200
0
200
400
600
800
1000
1200
PhOH Concentration (ppm)

PRODUCTION METHOD FOR POLYSILOXANE, COMPOSITION INCLUDING POLYSILOXANE, AND MOLDED BODY

This application is a U.S. national stage application of PCT/JP2021/034681 (filed Sep. 22, 2021), which claims priority to JP 2020-158566 (filed Sep. 23, 2020).

TECHNICAL FIELD

The present invention relates to a method for producing polysiloxane, a composition including polysiloxane, and the like.

BACKGROUND ART

Polymers of aromatic polysiloxane, also referred to as so-called polyarylenesiloxane, are known as materials for molded products by molding methods such as injection molding (for example, Patent Literature 1). In recent years, the importance of polysiloxane compounds such as polyarylenesiloxane has been growing, and polyarylenesiloxane is used as, for example, release layers in photocopying, photoresist materials, plasticizers for polycarbonate, or components in powder surface coating systems.

Known methods for producing polysiloxane compounds such as polyarylenesiloxanes include a method in which dimethyldichlorosilane and bisphenol A are allowed to react in a solvent, resulting in generation of hydrochloric acid (Non Patent Literature 1), and a method in which the reaction is carried out in a solvent to which acetic acid has been added (Patent Literature 2).

PRIOR ART DOCUMENTS

Patent Documents

Patent Literature 1: Japanese Translation of PCT International Application Publication No. 1996-502537

Patent Literature 2: Japanese Translation of PCT International Application Publication No. 2015-512999

Non Patent Documents

Non Patent Literature 1: Journal of Polymer Science, Vol. 18, 3119-3127 (1980)

SUMMARY OF THE INVENTION

Problems to be Solved by the Invention

For example, a method for producing polysiloxane compounds that does not involve production of corrosive substances such as hydrochloric acid or acetic acid, does not necessarily require the use of solvents, and reduces environmental burden has been desired.

Furthermore, in conventional methods for producing polysiloxane compounds, the reaction rate is not always sufficiently high, and an efficient method for producing polysiloxane compounds has been desired.

Means for Solving the Problems

The present invention provides, for example, a method for efficiently producing polysiloxane compounds that does not generate by-products with high environmental burden, such as acids, and that can be performed without solvents, especially without solvents that require safety considerations.

The present invention includes, for example, a method for producing a polysiloxane described below.

[1] A method for producing a polysiloxane having a siloxane constituent unit represented by any of the following formula (1-1) to formula (1-4), comprising:

a polymerization step of polymerizing a silane-based compound and a diol compound including an aromatic diol compound or an alicyclic diol compound, wherein the silane-based compound is selected from:

a diaryloxysilane compound including at least any of a dialkyldiaryloxysilane, a diaryldiaryloxysilane, and a monoalkylmonoaryldiaryloxysilane;

a dialkoxysilane compound including at least any of a dialkyldialkoxysilane, a diaryldialkoxysilane, and a monoalkylmonoaryldialkoxysilane; and a silicon compound including at least one of a cyclic siloxane compound and a linear siloxane compound, and in the polymerization step, a transesterification catalyst including a phosphorus compound is used:

(1-1)

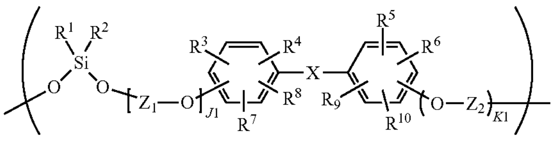

(1-2)

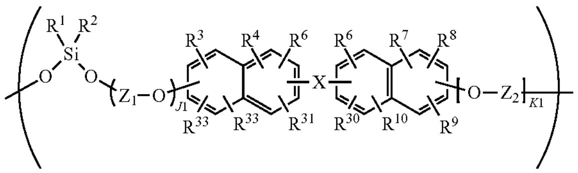

(1-3)

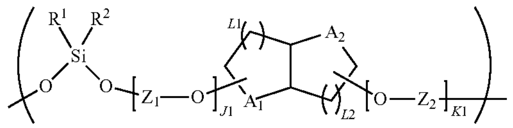

(1-4)

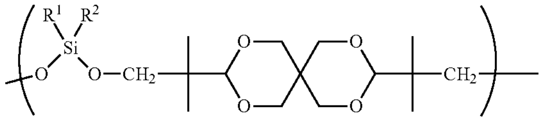

wherein $R^1$ and $R^2$ each independently represent an alkyl group having 1 to 20 carbon atoms in total and optionally having a substituent or an aryl group having 6 to 30 carbon atoms in total and optionally having a substituent;

$R^3$ to $R^{10}$ and $R^{30}$ to $R^{33}$ each independently represent hydrogen, a halogen, an alkoxy, an alkyl group having 1 to 20 carbon atoms in total and optionally having a substituent, an alkenyl group having 2 to 20 carbon atoms in total and optionally having a substituent, or an aryl group having 6 to 30 carbon atoms in total and optionally having a substituent;

$Z_1$ and $Z_2$ are each independently an alkylene group having 1 to 5 carbon atoms in total and optionally having a substituent;

$J_1$ each independently represent an integer of 0 or more and 5 or less;

$K_1$ each independently represent an integer of 0 or more and 5 or less;

$A_1$ and $A_2$ each independently represent any of —O— and —CH—;

$L_1$ and $L_2$ each independently represent an integer of 0 or more and 3 or less;

X is a single bond or any of structural formulas represented by the following formula (2):

(2)

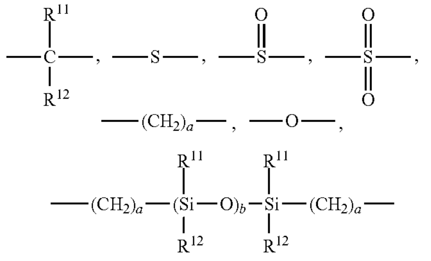

wherein $R^{11}$ and $R^{12}$ each independently represent hydrogen, a halogen, an alkyl group having 1 to 20 carbon atoms in total and optionally having a substituent, or an aryl group having 6 to 30 carbon atoms in total and optionally having a substituent, or $R^{11}$ and $R^{12}$ are bonded to each other to form and represent a carbocycle or heterocycle having 1 to 20 carbon atoms and optionally having a substituent;

the substituent is each independently any of a halogen, a cyano group, an alkenyl group, an alkynyl group, and an alkoxy group; and a and b each independently represent an integer of 0 or 1 or more and 5000 or less.

[2] The method for producing a polysiloxane according to the above [1], wherein the phosphorus compound includes a compound represented by the following general formula (I):

$$(PRe_4)^+(Xc)^- \quad (I)$$

wherein Re each independently represents an alkyl group, an aryl group, or an alkylaryl group, and a plurality of Re are optionally bonded to each other to form a ring structure; and Xc represents a hydroxyl group, a halogen atom, an alkyloxy group, an aryloxy group, an alkylcarbonyloxy group, an arylcarbonyloxy group, $HCO_3$, or $BRf_4$, where Rf is each independently a hydrogen atom, an alkyl group, or an aryl group.

[3] The method for producing a polysiloxane according to the above [1], wherein the phosphorus compound includes any of biphenyltriphenylphosphonium hydroxide, biphenyltriphenylphosphonium tetraphenylborate, biphenyltriphenylphosphonium phenoxide, biphenyltriphenylphosphonium chloride, tetraphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium phenoxide, tetraphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, methoxyphenyltriphenylphosphonium chloride, phenoxyphenyltriphenylphosphonium chloride, and naphthylphenyltriphenylphosphonium chloride.

[4] The method for producing a polysiloxane according to the above [3], wherein the phosphorus compound includes at least any of tetraphenylphosphonium phenoxide and tetraphenylphosphonium tetraphenylborate.

[5] The method for producing a polysiloxane according to any of the above [1] to [4], wherein the transesterification catalyst further includes an alkali metal catalyst.

[6] The method for producing a polysiloxane according to the above [5], wherein the transesterification catalyst includes an alkali metal-based transesterification catalyst including at least sodium.

[7] The method for producing a polysiloxane according to any of the above [1] to [6], wherein, in the polymerization step, an amount of the transesterification catalyst relative to the diol compound is $1.0\times10^{-7}$ to $1.0\times10^{-2}$ in a molar ratio.

[8] The method for producing a polysiloxane according to any of the above [1] to [7], wherein a reaction temperature in the polymerization step is in the range of 150 °C or higher and 300 °C or lower.

[9] The method for producing a polysiloxane according to any of the above [1] to [8], wherein no solvent is used in the polymerization step.

[10] The method for producing a polysiloxane according to any of the above [1] to [9], wherein a ratio of the number of moles of the silane-based compound to the number of moles of the diol compound used in the polymerization step is 0.9 or more and 1.2 or less.

[11] The method for producing a polysiloxane according to any of the above [1] to [10], wherein a carbonate compound is further polymerized with the silane-based compound and the diol compound in the polymerization step.

[12] The method for producing a polysiloxane according to any of the above [1] to [11], wherein the polysiloxane further has a polycarbonate constituent unit derived from the carbonate compound and represented by any of the following formulas (3-1) to (3-4):

(3-1)

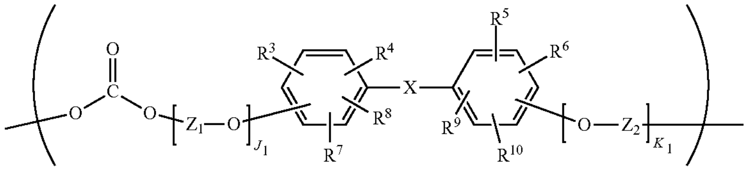

-continued (3-2)

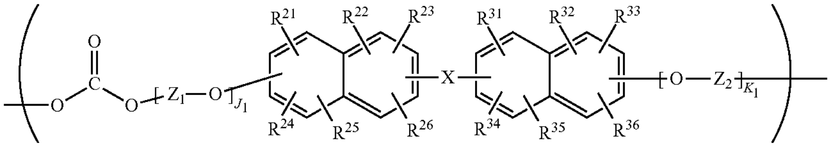

(3-3)

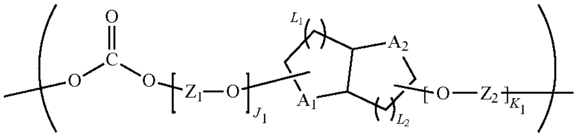

(3-4)

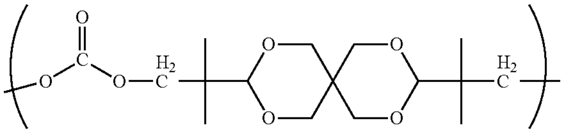

wherein $R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

the substituent is any of a halogen, a cyano group, an alkenyl group, an alkynyl group, and an alkoxy group;

$J_1$ each independently represent an integer of 0 to 5;

$K_1$ each independently represent an integer of 0 to 5;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

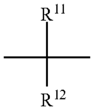

(2)

—S—

(3)

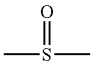

(4)

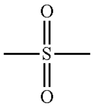

(5)

—O—

(6)

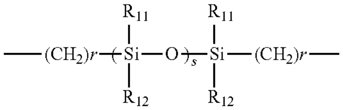

-continued (7)

$—(CH_2)r—$ wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_1$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

[13] The method for producing a polysiloxane according to the above [12], wherein a molar ratio between the siloxane constituent unit in total and the polycarbonate constituent unit in total is 0.1:99.9 to 100:0.

[14] The method for producing a polysiloxane according to the above [12] or [13], wherein in the polymerization step, the silane-based compound and the diol compound are polymerized under reduced pressure in a molten state while an alcohol derived from the carbonate compound is removed.

[15] The method for producing a polysiloxane according to any of the above [1] to [10], wherein the polysiloxane consists only of the siloxane constituent unit.

[16] The method for producing a polysiloxane according to any of the above [1] to [15], wherein the polysiloxane has a weight average molecular weight (Mw) in terms of polystyrene of 10,000 to 300,000.

[17] The method for producing a polysiloxane according to any of the above [1] to [16], wherein, in the polysiloxane, a low molecular weight compound having a weight average molecular weight of 1,000 or less accounts for 1% by weight or less.

[18] The method for producing a polysiloxane according to the above [17], wherein, in the polysiloxane, a proportion calculated from a GPC area ratio of the low molecular weight compound having a weight average molecular weight of 1,000 or less is 1% by weight or less.

[19] The method for producing a polysiloxane according to any of the above [1] to [18], wherein the polysiloxane has a 1% mass reduction thermal decomposition temperature of 300 °C or higher.

[20] The method for producing a polysiloxane according to any of the above [1] to [19], wherein the polysiloxane has a mass retention rate at 500 °C of 40% or more.

[21] A composition comprising a polysiloxane obtained by the production method according to any one of the above [1] to [20], and a polycarbonate resin.

[22] The composition according to the above [21], wherein the composition has a total Si content of 0.1 to 20% by mass.

[23] A molded body comprising a polysiloxane obtained by the production method according to any one of the above [1] to [20].

[24] An optical lens comprising a polysiloxane obtained by the production method according to any one of the above [1] to [20].

[25] An optical lens obtained by molding the composition according to any one of the above [21] and [22].

Advantageous Effect of the Invention

According to the method for producing a polysiloxane of the present invention, the polysiloxane can be efficiently produced while improving safety and reducing environmental burden. Furthermore, according to the present invention, a composition, molded body, or the like containing polysiloxane can also be realized.

BRIEF DESCRIPTION OF DRAWINGS

FIG. 1 is a standard curve used to calculate the phenol conversion rate in each of Examples and Comparative Examples, and shows the relationship between the value of the phenol peak area measured by GC/FID under the conditions described later and the phenol concentration in the sample.

EMBODIMENTS FOR CARRYING OUT THE INVENTION

[I. Polysiloxane]

A method for producing a polysiloxane in the present invention has a polymerization step of polymerizing at least one or more silane-based compounds and a diol compound such as an aromatic diol compound, the silane-based compounds being selected from a specific diaryloxysilane compound, a specific dialkoxysilane compound, and a specific silicon compound (siloxane compound), all of which will be described in detail later. In the polymerization step, a transesterification catalyst including at least a phosphorus compound is used, as will be described in detail later.

Schematically illustrating the above-mentioned polymerization reaction, it is as follows. For example, the polysiloxane compound below is obtained by allowing a diaryloxysilane compound having two methyl groups and two phenoxy groups ($Si(CH_3)_2(OPh)_2$), which is one example of the silane-based compound, to react with bisphenol A, which is one example of the aromatic diol compound.

That is, it is a polysiloxane compound having a siloxane constituent unit produced by, for example, the reaction of the following formula (A).

In this polymerization reaction, as described below, an alcohol derived from the silane-based compound, such as an aryl alcohol including phenol (PhOH), is generated as a by-product. Therefore, in the polymerization step, it is preferable to proceed the polymerization reaction while the mixture of each of the above-mentioned components is melted and the byproduct alcohol, such as an aryl alcohol including phenol, is removed under reduced pressure.

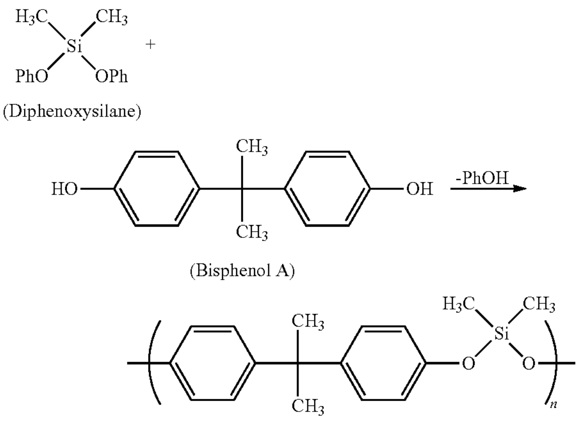

(Diphenoxysilane)
(Bisphenol A)
(A)

In addition, a carbonate compound such as diphenyl carbonate (PhO—CO—OPh) may be used in the polymerization reaction along with each of the above-mentioned components. As described above, when a carbonate compound is used as an additive component, for example, as shown by the formula (B) below, a polycarbonate constituent unit is formed by the reaction between the carbonate compound and a diol compound, such as an aromatic diol compound.

Although the polysiloxane of the present invention preferably consists only of the siloxane constituent unit, the further use of a carbonate compound, as mentioned above, produces a polysiloxane compound including a polycarbonate constituent unit in addition to the siloxane constituent unit, as a polycarbonate copolymer.

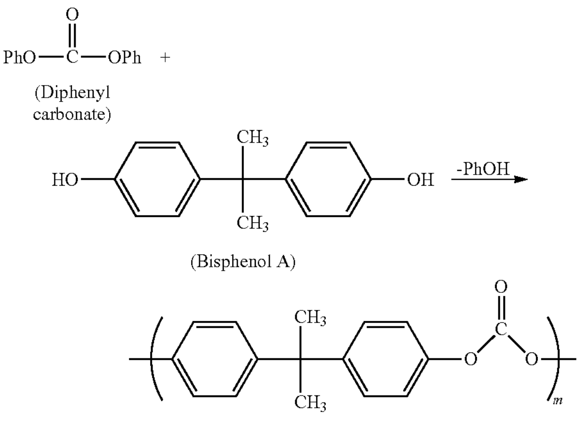

(Diphenyl carbonate)
(Bisphenol A)
(B)

Hereinafter, the method for producing a polysiloxane compound according to the present invention will be described in detail.

<1. Method for Producing Polysiloxane>

[(I) Silane-Based Compound]

The silane-based compound used in the polymerization step is used for forming the siloxane constituent unit in the polysiloxane compound as shown in the above formula (A), for example. Although the type of the silane-based compound is not particularly limited as long as it is capable of forming a siloxane constituent unit including a $—OSi(R^1R^2)O—$ moiety in the main chain of the polysiloxane compound, the details of which will be mentioned later, it is selected from a specific diaryloxysilane compound, a specific dialkoxysilane compound, and a specific silicon compound (siloxane compound).

That is, in the polymerization step, at least any of the following silane-based compounds are used: a diaryloxysilane compound, a dialkoxysilane compound, and a silicon compound, the details of which will be mentioned later. The silane-based compound to be used may be a combination of a plurality of diaryloxysilane compounds, a combination of a plurality of dialkoxysilane compounds, a combination of a plurality of silicon compounds, a mixture of a diaryloxysilane compound and a silicon compound, a mixture of a dialkoxysilane compound and a silicon compound, or a mixture of a diaryloxysilane compound and a dialkoxysilane compound. Hereinafter, the diaryloxysilane compound will be described.

(A-1) Diaryloxysilane Compound

Examples of the diaryloxysilane compound include a dialkyldiaryloxysilane, a diaryldiaryloxysilane, and a monoalkylmonoaryldiaryloxysilane. That is, any one of these or a plurality of them may be used as the silane-based compound in the polymerization step.

When the diaryloxysilane compound is represented by the general formula $Si(R^aR^b)(OAr)_2$, $R^a$ and $R^b$ are each independently selected from an alkyl group and an aryl group. It is preferable that $R^a$ and $R^b$ be each independently an alkyl group having 1 to 20 carbon atoms in total and optionally having a substituent or an aryl group having 6 to 30 carbon atoms in total and optionally having a substituent. More preferably, when $R^a$ and $R^b$ are each an alkyl group optionally having a substituent, the number of carbon atoms in total is preferably 1 to 10, the number of carbon atoms in total is more preferably 1 to 6, and the number of carbon atoms in total is particularly preferably 1 or 2.

Also, when $R^a$ and $R^b$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^a$ and $R^b$ in formula (1) include a methyl group, a phenyl group, a vinyl group, and a propyl group.

Note that, as is obvious from the above formula (A), the aryloxy group (OAr group) of the silane compound is not introduced into the polymer chain of the polysiloxane compound, but generates a by-product (ArOH), such as phenol. For this reason, there is no limitation on the type of the aryloxy group. However, in order to remove the by-product in the polymerization step from the reaction system as easily as possible, it is preferable that the aryloxy group have low polarity and a low molecular weight, and it is, for example, a phenoxy group.

Specific examples of the dialkyldiaryloxysilane include dimethyldiphenoxysilane, methylethyldiphenoxysilane, and diethyldiphenoxysilane, and specific examples of the diaryldiaryloxysilane include diphenyldiphenoxysilane. Also, specific examples of the monoalkylmonoaryldiaryloxysilane include methylphenylphenoxysilane.

(A-2) Dialkoxysilane Compound

Examples of the dialkoxysilane compound include a dialkyldialkoxysilane, a diaryldialkoxysilane, and a monoalkylmonoaryldialkoxysilane. That is, any one of these or a plurality of them may be used as the silane-based compound in the polymerization step.

When the dialkoxysilane compound is represented by the general formula $Si(R^aR^b)(OR^C)_2$, $R^a$ and $R^b$ are each independently selected from an alkyl group and an aryl group, which are the same as for $R^a$ and $R^b$ described in the (A-1) Diaryloxysilane compound column.

Note that, as is obvious from the above formula (A), the alkoxy group ($OR^c$ group) of the silane compound is not introduced into the polymer chain of the polysiloxane compound, but generates a by-product, such as methanol (MeOH). For this reason, there is no particular limitation on the type of the alkoxy group. However, in order to remove the by-product in the polymerization step from the reaction system as easily as possible, the alkoxy group ($OR^c$ group) is, for example, a methoxy group.

Specific examples of the dialkyldialkoxysilane include dimethyldimethoxysilane, methylethyldimethoxysilane, and diethyldimethoxysilane, and specific examples of the diaryldialkoxysilane include diphenyldimethoxysilane. Also, specific examples of the monoalkylmonoaryldialkoxysilane include methylphenyldimethoxysilane.

(B) Silicon Compound (Siloxane Compound)

Hereinafter, the silicon compound will be described. Examples of the silicon compound include a specific cyclic siloxane compound and a linear siloxane compound. That is, any of these may be used as the silane-based compound in the polymerization step.

(B-1) Cyclic Siloxane Compound

Examples of the siloxane compound used in the polymerization step include a cyclic siloxane compound represented by the following formula (5).

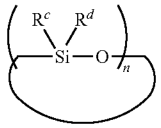

(5)

In formula (5), $R^c$ and $R^d$ each independently represent an alkyl group, alkenyl group, or aryl group optionally having a substituent. It is preferable that $R^c$ and $R^d$ in formula (5) be each an alkyl group having 1 to 20 carbon atoms in total and optionally having a substituent or an aryl group having 6 to 30 carbon atoms in total and optionally having a substituent.

When $R^c$ and $R^d$ are each an alkyl group optionally having a substituent, the number of carbon atoms in total is preferably 1 to 10, the number of carbon atoms in total is more preferably 1 to 6, and the number of carbon atoms in total is particularly preferably 1 or 2.

Also, when $R^c$ and $R^d$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^c$ and $R^d$ in formula (5) include a methyl group, a phenyl group, a vinyl group, and a propyl group.

The cyclic siloxane compound has a siloxane structure, and examples of the siloxane structure include a —OSi($R^cR^d$)O— structure having the above-mentioned $R^c$ group and $R^d$ group. In the polymerization step, such a —OSi($R^cR^d$)O— moiety of the cyclic siloxane compound is introduced into the polysiloxane compound, the details of which will be mentioned later.

In formula (5), n represents an integer of 3 or more and 30 or less. The value of n in formula (5) is preferably 3 or more and 15 or less, more preferably 3 or more and 10 or less, still more preferably 3 or more and 8 or less, and particularly preferably 3 or more and 5 or less.

The molecular weight of the cyclic siloxane compound represented by formula (5) is preferably 2,000 or less, more preferably 1,600 or less, still more preferably 1,200 or less, and particularly preferably 1,000 or less. Also, the molecular weight of the cyclic siloxane compound represented by formula (5) is, for example, 100 or more, preferably 150 or more, and more preferably 200 or more.

(B-2) Linear Siloxane Compound

Examples of the siloxane compound used in the polymerization step also include a linear siloxane compound represented by the following formula (6).

(6)

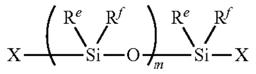

In formula (6), $R^e$ and $R^f$ each independently represent an alkyl group or aryl group optionally having a substituent. It is preferable that $R^e$ and $R^f$ in formula (6) be each an alkyl group having 1 to 20 carbon atoms in total and optionally having a substituent or an aryl group having 6 to 30 carbon atoms in total and optionally having a substituent.

When $R^e$ and $R^f$ are each an alkyl group optionally having a substituent, the number of carbon atoms in total is preferably 1 to 10, the number of carbon atoms in total is more preferably 1 to 8, and the number of carbon atoms in total is particularly preferably 1 or 2.

Also, when $R^e$ and $R^f$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^e$ and $R^f$ in formula (6) include a methyl group, a phenyl group, a vinyl group, and a propyl group.

The linear siloxane compound also has a siloxane structure, and examples of the siloxane structure include a —OSi($R^eR^f$)O— structure having the above-mentioned $R^e$ group and $R^f$ group. In the polymerization step, the —OSi(RR)O— moiety of the linear siloxane compound is introduced into the polysiloxane compound, the details of which will be mentioned later.

In formula (6), m represents an integer of 2 or more and 10,000 or less. The value of m in formula (6) is preferably 10 or more and 7,000 or less, more preferably 100 or more and 2,000 or less, and still more preferably 200 or more and 500 or less.

In formula (6), X each independently represents a hydrogen atom, a hydroxyl group, an alkoxy group having 1 to 10 carbon atoms in total and optionally having a substituent, a hydrocarbon group optionally having a substituent, optionally having an oxygen atom or nitrogen atom, and having 1 to 10 carbon atoms in total, or an amino group optionally having a substituent. Preferably, X is each independently any of a hydrogen atom, a hydroxyl group, an alkoxy group having 1 to 10 carbon atoms in total and optionally having a substituent, and an alkyl group optionally having a substituent, optionally having an oxygen atom or nitrogen atom, and having 1 to 10 carbon atoms in total. More preferably, it is a hydroxyl group or an alkyl group having 1 to 10 carbon atoms in total and optionally having a substituent, and still more preferably, it is a hydroxyl group or an alkyl group having 1 to 5 carbon atoms in total.

Examples of the above-mentioned substituent for X include a hydroxyl group, a halogen, an amino group, a vinyl group, a carboxyl group, a cyano group, a (meth)acryloxy group, a glycidyloxy group, and a mercapto group.

The molecular weight of the linear siloxane compound represented by formula (6) is preferably 60,000 or less, more preferably 56,000 or less, still more preferably 50,000 or less, and particularly preferably 45,000 or less. Also, the molecular weight of the linear siloxane compound represented by formula (6) is, for example, 1,000 or more, preferably 5,000 or more, and more preferably 10,000 or more.

Among the above-mentioned cyclic siloxane compound of formula (5) and the linear siloxane compound represented by the following formula (6), only a single siloxane compound may be used, or two or more types of siloxane compounds may be used as a mixture. Also, the siloxane compound of formula (5) or formula (6) may be used in combination with the above-mentioned (A) diaryloxysilane compound.

Note that the above-mentioned silane-based compound can be synthesized by known methods, or those commercially available may be used.

[(II) Diol Compound]

As mentioned above, the diol compound is used together with the silane-based compound in the polymerization step. Examples of the diol compound include the following.

[(II-1) Aromatic Diol Compound]

The aromatic diol compound used in the polymerization step is used for constituting the main chain of the polysiloxane compound, as shown in the above formulas (A) and (B), which relate to the outline of the polymerization reaction.

As the aromatic diol compound used in the polymerization step, a monomer that can be used as a material for polycarbonate resin is preferable, and examples thereof include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenylsulfone, 4,4'-dihydroxy-3,3'-dimethyldiphenylsulfone, 2,2-bis(3-t-butyl-4-hydroxyphenyl)propane, 2,2-bis(3-bromo-4-hydroxyphenyl)propane, 1,1-bis(3-cyclohexyl-4-hydroxyphenyl)cyclohexane, 1,1-bis(4-hydroxyphenyl)-3,3,5-trimethylcyclohexane, 4,4'-dihydroxybiphenyl, 9,9-bis(4-hydroxyphenyl)fluorene, 9,9-bis(4-hydroxy-3-methylphenyl)fluorene, 4,4'-sulfonyldiphenol, 2,2'-diphenyl-4,4'-sulfonyldiphenol, 2,2'-dimethyl-4,4'-sulfonyldiphenol, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol, 1,3-bis(4-hydroxyphenyl)-5,7-dimethyladamantane, 9,9-bis(4-(2-hydroxyethoxy)phenyl)fluorene (BPEF), 9,9-bis(4-(2-hydroxyphenyl)fluorene, 9,9-bis(4-hydroxy-3-methylphenyl)fluorene, 9,9-bis(4-hydroxy-3-tert-butylphenyl)fluorene, 9,9-bis(4-hydroxy-3-isopropylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 2,2'-bis(2-hydroxyethoxy)-1,1'-binaphthalene (BNE), 9,9-bis(6-(2-hydroxyethoxy)naphthalen-2-yl)fluorene (BNEF), 2,2'-bis(2-hydroxyethoxy)-6,6'-diphenyl-1,1'-binaphthalene, and 2,2'-bis(2-hydroxyethoxy)-6,6'-di(phenanthren-9-yl)-1,1'-binaphthalene. Among these, 9,9-bis(4-(2-hydroxyethoxy)phenyl)fluorene (BPEF), 9,9-bis(4-(2-hydroxyethoxy)-3-phenylphenyl)fluorene (BPPEF), and 9,9-bis(4-(2-hydroxyethoxy)-3-methylphenyl)fluorene (BPMEF) are preferable, and 9,9-bis(4-(2-hydroxyethoxy)phenyl)fluorene (BPEF) and 9,9-bis(4-(2-hydroxyethoxy)-3-phenylphenyl)fluorene (BPPEF) are more preferable.

[(II-2) Alicyclic Diol Compound]

Examples of the alicyclic diol compound used in the polymerization step include the following:

isosorbide represented by the following formula (compound of the above formula (1-3), wherein $L_1$ and $L_2$ are 1, $A_1$ and $A_2$ are oxygen atoms, and $J_1$, $K_1$, $J_2$, and $K_2$ are 0);

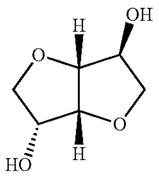

spiroglycol (SPG) represented by the following formula;

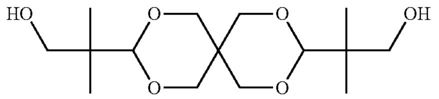 [SMILES: CC(C)(CO)C1OCC2(CO1)COC(C(C)(C)CO)OC2]

decahydro-1,4:5,8-dimethanonaphthalenediol represented by the following formula (D-NDM, R is hydrogen in the following formula) and the like;

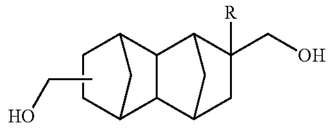

(R represents a hydrogen atom or an alkyl group having 1 to 4 carbon atoms. R is preferably hydrogen)

cyclohexanedimethanol represented by the following formula;

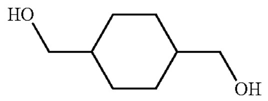

pentacyclopentadecanedimethanol (PCPMD) represented by the following formula;

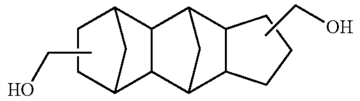

tricyclodecanedimethanol (TCDDM) represented by the following formula; and

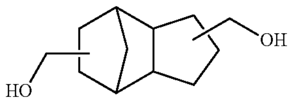

adamantanedimethanol such as 1,3-adamantanedimethanol represented by the following formula.

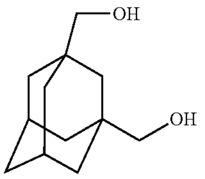 [SMILES: OCC12CC3CC(C1)CC(CO)(C3)C2]

In the main chain of the polysiloxane compound, it is preferable that the constituent units derived from these alicyclic diols be included.

The above-mentioned polysiloxane compound has high flowability, is suited for forming molded bodies, and is also suitably used in the molding of thin sheets, films, and the like, for example.

[(III) Carbonate Compound (Optional Component)]

The carbonate compound is used for introducing a carbonyl group (—CO— group) of the polycarbonate constituent unit into the polysiloxane compound, as shown in the above formula (B), which relates to the outline of the polymerization reaction. That is, two —OR groups of a carbonate compound represented by the general formula RO—CO—OR (R is each independently selected from an aryl group, an alkyl group, and an aralkyl group), for example, two aryloxy groups (ArO— groups) when the carbonate compound is a diaryl carbonate represented by the general formula ArO—CO—OAr are not introduced into the polymer chain of the polysiloxane compound. These —OR groups generate an alcohol derived from the carbonate compound as a by-product, and for example, a carbonate compound having an aryloxy group (ArO— group) (monoaryl carbonate or diaryl carbonate) generates an aryl alcohol (ArOH), such as phenol, which is a by-product.

For this reason, there is no particular limitation on the types of the aryl group, alkyl group, and aralkyl group of the carbonate compound. However, in order to remove the by-product in the polymerization step from the reaction system as easily as possible, it is preferable that the —OR group in the above general formula be an aryloxy group (or the —R group in the above general formula RO—CO—OR be an aryl group) in the carbonate compound, and furthermore, it is preferable that the carbonate compound have low polarity and a low molecular weight. The —OR group in the above general formula is, for example, a phenoxy group.

From the above, in the carbonate compound, it is preferable that either or both of the above-mentioned Ar groups be aryl groups having 10 or less carbon atoms in total, such as phenyl groups or benzyl groups. That is, although preferred specific examples of the carbonate compound include a diaryl carbonate such as diphenyl carbonate, dibenzyl carbonate, ditolyl carbonate, bis(chlorophenyl) carbonate, and m-cresyl carbonate, it may be a dialkyl carbonate such as dimethyl carbonate, diethyl carbonate, dibutyl carbonate, and dicyclohexyl carbonate, or a monoaryl monoalkyl carbonate.

Note that the above-mentioned carbonate compound can be synthesized by known methods, or those commercially available may be used.

[(IV) Transesterification Catalyst]

The transesterification catalyst to be used in the polymerization step is as follows.

(IV-1) Phosphorus-Based Transesterification Catalyst

As the transesterification catalyst in the polymerization step, a catalyst including at least a phosphorus compound is used.

It is preferable that the phosphorus-based transesterification catalyst include at least a compound represented by the following general formula (8).

$$(PRe_4)^+(Xc)^- \quad (8)$$

In general formula (8), Re each independently represents an alkyl group, an aryl group, or an alkylaryl group, and a plurality of Re are optionally bonded to each other to form a ring structure. It is preferably an aryl group having 6 to 16 carbon atoms.

In general formula (8), Xc is a hydroxyl group, a halogen atom, an alkyloxy group, an aryloxy group, an alkylcarbonyloxy group, an arylcarbonyloxy group, $HCO_3$, or $BRf_4$ (Rf is each independently a hydrogen atom, an alkyl group, or an aryl group), and it is preferably an aryloxy group including an aryl group having 6 to 16 carbon atoms, $BRf_4$ including an aryl group having 6 to 16 carbon atoms as $Rf_4$, or the like.

Note that these aryl groups having 6 to 16 carbon atoms are aryl groups preferably having 6 to 12 carbon atoms, and more preferably having 6 to 8 carbon atoms.

Specific examples of the phosphorus-based transesterification catalyst include biphenyltriphenylphosphonium hydroxide, biphenyltriphenylphosphonium tetraphenylborate, biphenyltriphenylphosphonium phenoxide, biphenyltriphenylphosphonium chloride, tetraphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, methoxyphenyltriphenylphosphonium chloride, phenoxyphenyltriphenylphosphonium chloride, and naphthylphenyltriphenylphosphonium chloride.

Among these, in particular, tetraphenylphosphonium phenoxide, tetraphenylphosphonium tetraphenylborate, and the like are preferable.

(IV-2) Alkali Metal-Based Transesterification Catalyst (Catalyst Including Basic Compound)

In the polymerization step, other transesterification catalysts may be used in addition to the above-mentioned phosphorus compound catalyst. As the transesterification catalyst used in addition to the phosphorus compound catalyst, a catalyst including a basic compound is preferable. Examples of the basic compound catalyst include those including alkali metal compounds, alkaline earth metal compounds, and the like, and examples of such compounds include organic acid salts, inorganic salts such as carbonates, oxides, hydroxides, hydrides, and alkoxides of alkali metals, alkaline earth metal compounds, and the like. Alternatively, as the basic compound catalyst, quaternary ammonium hydroxides and their salts, amines, and the like are used. These compounds can be used alone, or multiple types of them can be used in combination.

As the secondary transesterification catalyst used in combination with the phosphorus compound catalyst, among the above-mentioned basic compound catalysts, alkali metal catalysts, that is, those including alkali metal carbonates, alkali metal organic acid salts, or alkali metal hydroxides, are preferable. Specific examples of the alkali metal catalyst include those including cesium carbonate, potassium carbonate, sodium carbonate, sodium bicarbonate, cesium hydroxide, potassium hydroxide, sodium hydroxide, sodium acetate, and sodium benzoate. As described above, preferred examples of the component included in the basic compound catalyst include alkali metals, such as sodium. That is, the secondary transesterification catalyst is preferably an alkali metal-based catalyst including at least sodium, or the like. By using an alkali metal organic acid salt such as sodium acetate or sodium benzoate together with the phosphorus compound catalyst, the thermal stability of the polysiloxane compound can be improved.

Note that the above-mentioned secondary transesterification catalyst can be prepared by known methods, or those commercially available may be used.

[(V) Polymerization Step]

In the polymerization step, at least the above-mentioned (I) silane-based compound and (II) diol compound are polymerized together with (III) carbonate compound, which is an optional component, in the presence of (IV) transesterification catalyst. In this polymerization reaction, the mixture of each of the above components is melted, and while in a molten state, the by-product alcohol derived from the silane-based compound and diol compound, such as an aryl alcohol, is removed under reduced pressure. By setting the reaction conditions in this way, the polymerization reaction can be proceeded efficiently.

In the polymerization step, it is preferable to proceed the polymerization reaction under a pressure of 400 Pa or less. That is, it is preferable that the pressure in the polymerization reaction be in the range of 400 Pa or less.

In the polymerization step, it is preferable to maintain the system at normal pressure without pressure reduction or with little pressure reduction for a certain period of time, and then reduce the pressure in the system to further proceed the polymerization reaction. For example, in the polymerization step, it is preferable to gradually decrease the reaction pressure from the initial atmospheric pressure to 400 Pa or less, such as 27,000 Pa, 24,000 Pa, 20,000 Pa, 16,000 Pa, 8,000 Pa, 4,000 Pa, 2,000 Pa, 400 Pa, and 400 Pa or less. As described above, the pressure reduction step, in which the pressure in the reaction system is reduced in stages and the pressure reduction degree is improved in the middle of the step, can efficiently remove the by-product alcohol while suppressing the distillation of the raw materials, which is preferable.

The time of the polymerization step can be determined as appropriate, taking into consideration conditions such as the type of target polysiloxane compound, pressure, and temperature. For example, the total time spent for the polymerization step is 5 to 10 hours or less. In more detail, the reaction time before pressure reduction in the reaction system is 0.5 to 3 hours, preferably 1 to 2 hours, and the reaction time after pressure reduction is 1 to 5 hours, preferably 2 to 4 hours.

In the polymerization step, it is preferable that the temperature in the above-mentioned polymerization reaction be in the range of 150 to 300 °C. More preferably, the temperature of the polymerization reaction is 180 to 290 °C, still more preferably 200 to 280 °C.

In addition, each component of the above-mentioned silane-based compound, diol compound such as aromatic diol compound, and carbonate compound such as diaryl carbonate as an optional component have good miscibility with each other, and the polysiloxane can be produced without using any solvent in the polymerization step. For this reason, the polymerization step can be simplified.

In the polymerization step, it is preferable that the ratio of the molar amount of the transesterification catalyst to the molar amount of the diol compound (molar ratio: that is, the value of the molar amount of the transesterification catalyst/the molar amount of the diol compound) be $1.0\times10^{-7}$ to $1.0\times10^{-2}$ (mol/mol: 0.1 to 10000 μmol/mol or $1.0\times10^{-4}$ to 10 mmol/mol). The above molar ratio is more preferably $1.0\times10^{-7}$ to $2.0\times10^{-5}$ mol/mol (or 0.1 to 20 μmol/mol).

In the polymerization step, the molar ratio of the diol compound to the silane-based compound (that is, the value of the number of moles of the silane-based compound/the number of moles of the diol compound) is, for example, 0.8 to 1.3, preferably 0.9 or more and 1.2 or less, more preferably 0.9 or more and 1.25 or less, and still more preferably 0.95 or more and 1.2 or less.

Also, when a carbonate compound such as diaryl carbonate is used in the polymerization step, the molar ratio of the diol compound to the total number of moles of the carbonate compound and silane-based compound (that is, the value of (the total number of moles of the carbonate compound and silane-based compound)/the number of moles of the diol compound) is preferably 0.9 or more and 1.2 or less, and more preferably, 0.95 or more and 1.15 or less.

Next, the polysiloxane according to the present invention will be described in detail.

<2. Polysiloxane>

[(I) Constituent Unit]

The polysiloxane produced by the production method of the present invention is a polymer having a siloxane constituent unit, as mentioned above, and specific examples thereof include the following.

That is, the polysiloxane is a polymer having a siloxane constituent unit represented by any of the following formulas (1-1) to (1-4).

(1-1)

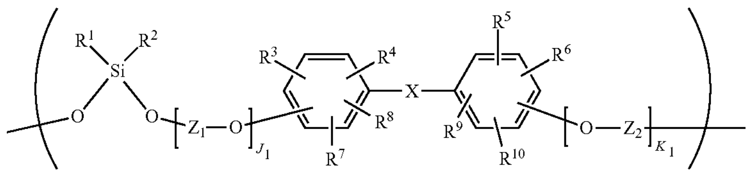

(1-2)

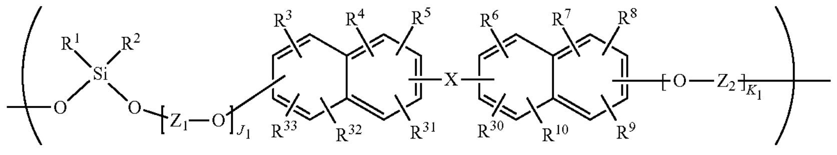

(1-3)

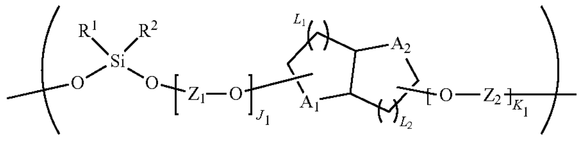

-continued

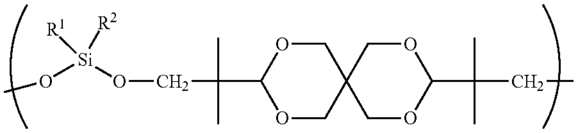

(1-4)

The siloxane structure including $R^1$ and $R^2$ in formulas (1-1) to (1-4) is introduced from the above-mentioned diaryloxysilane compound, dialkyldialkoxysilane, or silicon compound (siloxane compound).

In formulas (1-1) to (1-4), $R^1$ and $R^2$ each independently represent an alkyl group having 1 to 20 carbon atoms in total and optionally having a substituent or an aryl group having 6 to 30 carbon atoms in total and optionally having a substituent.

When $R^1$ and $R^2$ are each an alkyl group optionally having a substituent, the number of carbon atoms in total is preferably 1 to 10, the number of carbon atoms in total is more preferably 1 to 4, and the number of carbon atoms in total is particularly preferably 1 or 2.

Also, when $R^1$ and $R^2$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

In formulas (1-1) and (1-2), $R^3$ to $R^{10}$ and $R^{30}$ to $R^{33}$ each independently represent hydrogen, a halogen, an alkoxy, an alkyl group having 1 to 20 carbon atoms in total and optionally having a substituent, an alkenyl group having 2 to 20 carbon atoms in total and optionally having a substituent, or an aryl group having 6 to 30 carbon atoms in total and optionally having a substituent.

When $R^3$ to $R^{10}$ and $R^{30}$ to $R^{33}$ are each an alkyl group optionally having a substituent, the number of carbon atoms in total is preferably 1 to 10, the number of carbon atoms in total is more preferably 1 to 4, and the number of carbon atoms in total is particularly preferably 1 or 2.

When $R^3$ to $R^{10}$ and $R^{30}$ to $R^{33}$ are each an alkenyl group optionally having a substituent, the number of carbon atoms in total is preferably 2 to 10, the number of carbon atoms in total is more preferably 2 to 6, and the number of carbon atoms in total is particularly preferably 2 to 4.

Also, when $R^3$ to $R^{10}$ and $R^{30}$ to $R^{33}$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

In formulas (1-1) to (1-3), $Z_1$ and $Z_2$ are each independently an alkylene group having 1 to 5 carbon atoms in total and optionally having a substituent, preferably an alkylene group having 1 to 3 carbon atoms in total, and more preferably an alkylene group having 1 or 2 carbon atoms in total.

In formulas (1-1) to (1-3), $J_1$ and $K_1$ each independently represent an integer of 0 or more and 5 or less, preferably an integer of 0 or more and 3 or less, more preferably an integer of 0 or more and 2 or less, and for example, 1 or 2.

In formula (1-3), $A_1$ and $A_2$ each independently represent any of —O— and —CH— and $L_1$ and $L_2$ each independently represent an integer of 0 or more and 3 or less, and $L_1$ and $L_2$ are preferably 1 or 2.

In formulas (1-1) and (1-2), X is each independently a single bond or any of structural formulas represented by the following formula (2).

(2)

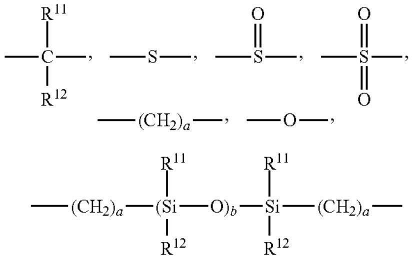

In formula (2), $R^{11}$ and $R^{12}$ each independently represent hydrogen, a halogen, an alkyl group having 1 to 20 carbon atoms in total and optionally having a substituent, or an aryl group having 6 to 30 carbon atoms in total and optionally having a substituent, or $R^{11}$ and $R^{12}$ are bonded to each other to form and represent a carbocycle or heterocycle having 1 to 20 carbon atoms and optionally having a substituent; and a and b each independently represent an integer of 0 or 1 or more and 5000 or less.

$R^{11}$ and $R^{12}$ are preferably each independently hydrogen, an alkyl group having 1 to 10 carbon atoms in total and optionally having a substituent, or an aryl group having 6 to 16 carbon atoms in total and optionally having a substituent.

In formula (2), a and b are each independently an integer of 0 or 1 or more and 5000 or less. a and b are each preferably an integer of 1000 or less, more preferably an integer of 500 or less, and still more preferably an integer of 100 or less.

Also, in the siloxane constituent unit, it is preferable that X be a fluorene ring structure formed by $R^{11}$ and $R^{12}$ being bonded to each other.

The above-mentioned optional substituent relating to formulas (1-1) to (1-4), (2), and the like is each independently selected from a halogen, a cyano group, an alkenyl group, an alkynyl group, and an alkoxy group.

Also, it is preferable that the siloxane constituent unit include at least one represented by the following formula (1).

(1)

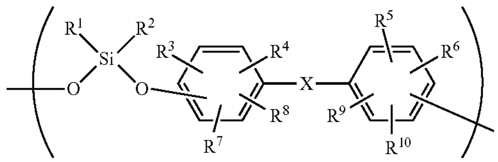

The siloxane structure including $R^1$ and $R^2$ in formula (1) is introduced from the above-mentioned diaryloxysilane compound, dialkoxysilane compound, or silicon compound (siloxane compound).

In formula (1), $R^1$ and $R^2$ each independently represent an alkyl group, alkenyl group, or aryl group optionally having a substituent. $R^1$ and $R^2$ in formula (1) are each an alkyl group having 1 to 20 carbon atoms in total and optionally having a substituent or an aryl group having 6 to 30 carbon atoms in total and optionally having a substituent.

Preferred options for $R^1$ and $R^2$ are the same as for $R^1$ and $R^2$ in the above formulas (1-1) to (1-4).

Examples of the above-mentioned substituent for $R^1$ and $R^2$ include a hydroxyl group, a halogen, an amino group, a vinyl group, a carboxyl group, a cyano group, a (meth) acryloxy group, a glycidyloxy group, and a mercapto group.

Preferred specific examples of $R^1$ and $R^2$ in formula (1) include a methyl group, a phenyl group, a vinyl group, and a propyl group.

In formula (1), preferred options for $R^3$ to $R^{10}$ are the same as for $R^3$ to $R^{10}$ in the above formulas (1-1) to (1-4).

Examples of the above-mentioned substituent for $R^3$ to $R^{10}$ include a hydroxyl group, a halogen, an amino group, a vinyl group, a carboxyl group, a cyano group, a (meth) acryloxy group, a glycidyloxy group, and a mercapto group.

In formula (1), X is the same as X in the above formulas (1-1) and (1-2). Also, it is preferable that the above-mentioned optional substituent relating to formula (1) be each independently selected from a halogen, a cyano group, an alkenyl group, an alkynyl group, and an alkoxy group.

It is preferable that the polysiloxane compound be a polymer having a siloxane constituent unit represented by any of the following formulas (1-1) to (1-4).

(1-1)'

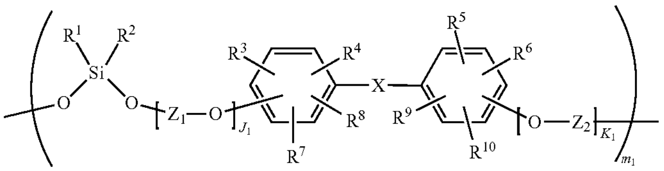

(1-2)'

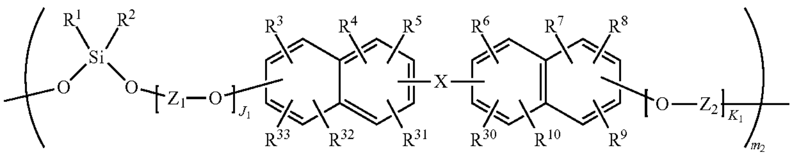

(1-3)'

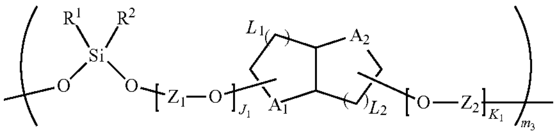

(1-4)'

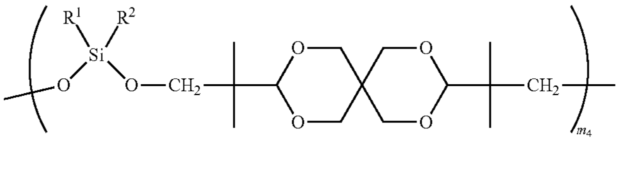

The signs in formulas (1-1') to (1-4'), such as $R^1$ to $R^{10}$, $Z_1$, $Z_2$, $J_1$, $K_1$, $A_1$, $A_2$, $L_1$, $L_2$, and X, each of which is common to those in formulas (1-1) to (1-4), have the same meanings as in formulas (1-1) to (1-4).

Also, it is preferable that the siloxane constituent unit include at least one represented by the following formula (1').

(1')

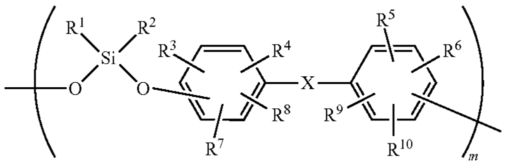

The signs in formula (1'), such as $R^1$ to $R^{10}$, each of which is common to those in formula (1), have the same meanings as in formula (1).

Then, $m_1$ to $m_4$ in the above formulas (1-1') to (1-4') and m in formula (1') each independently represent an integer of 10 or more and 1,000 or less. The values of $m_1$ to $m_4$ and m are each preferably 20 or more and 800 or less, and more preferably 30 or more and 500 or less.

Also, it is preferable that the optional polycarbonate constituent unit in the polysiloxane be represented by any of the following formulas (3-1) to (3-4).

$L_1$ and $L_2$ each independently represent an integer of 0 or more and 3 or less, and $L_1$ and $L_2$ are preferably 0 or more and 2 or less.

(3-1)

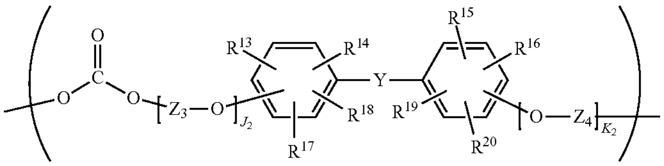

(3-2)

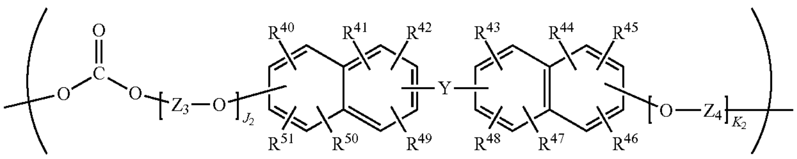

(3-3)

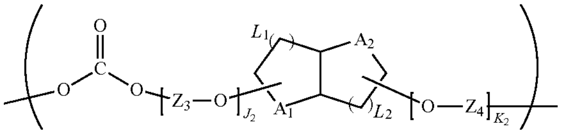

(3-4)

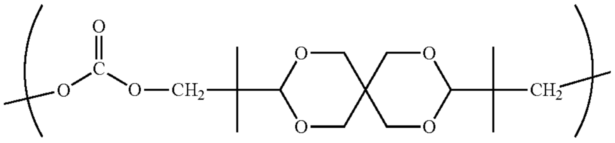

In (3-1) to (3-2), $R^{13}$ to $R^{20}$ and $R^{40}$ to $R^{51}$ each independently represent hydrogen, a halogen, an alkoxy, an alkyl group having 1 to 20 carbon atoms in total and optionally having a substituent, an alkenyl group having 2 to 20 carbon atoms in total and optionally having a substituent, or an aryl group having 6 to 30 carbon atoms in total and optionally having a substituent.

When $R^{13}$ to $R^{20}$ and $R^{40}$ to $R^{51}$ are each an alkyl group optionally having a substituent, the number of carbon atoms in total is preferably 1 to 10, the number of carbon atoms in total is more preferably 1 to 4, and the number of carbon atoms in total is particularly preferably 1 or 2.

When $R^{13}$ to $R^{20}$ and $R^{40}$ to $R^{51}$ are each an alkenyl group optionally having a substituent, the number of carbon atoms in total is preferably 2 to 10, the number of carbon atoms in total is more preferably 2 to 6, and the number of carbon atoms in total is particularly preferably 2 to 4.

Also, when $R^{13}$ to $R^{20}$ and $R^{40}$ to $R^{51}$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

In formulas (3-1) to (3-3), $Z_3$ and $Z_4$ are each independently an alkylene group having 1 to 5 carbon atoms and optionally having a substituent, preferably an alkylene group having 1 to 3 carbon atoms, and more preferably an alkylene group having 1 or 2 carbon atoms.

In formulas (3-1) to (3-3), $J_2$ and $K_2$ each independently represent an integer of 0 or more and 5 or less, preferably an integer of 0 or more and 3 or less, and more preferably 1 or 2.

In formula (3-3), $A_1$ and $A_2$ each independently represent any of —O— and —CH—; and Also, it is preferable that the above-mentioned optional substituent relating to formulas (3-1) to (3-4) be each independently selected from a halogen, a cyano group, an alkenyl group, an alkynyl group, and an alkoxy group.

In formulas (3-1) to (3-2), Y is each independently a single bond or any of structural formulas represented by formula (4).

(4)

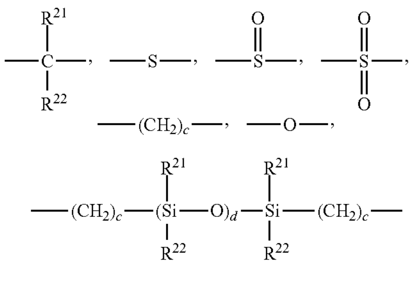

(In the formulas, $R^{21}$ and $R^{22}$ each independently represent hydrogen, a halogen, an alkyl group having 1 to 20 carbon atoms and optionally having a substituent, or an aryl group having 6 to 30 carbon atoms and optionally having a substituent, or $R^{21}$ and $R^{22}$ are bonded to each other to form and represent a carbocycle or heterocycle having 1 to 20 carbon atoms and optionally having a substituent, and c and d each independently represent an integer of 0 or 1 or more and 5000 or less.

$R^{21}$ and $R^{22}$ are preferably each independently hydrogen, an alkyl group having 1 to 10 carbon atoms and optionally having a substituent, or an aryl group having 6 to 16 carbon atoms and optionally having a substituent.

In formula (4), c and d are each independently an integer of 0 or 1 or more and 5000 or less. c and d are each preferably an integer of 1000 or less, more preferably an integer of 500 or less, and still more preferably an integer of 100 or less.

Also, in the polycarbonate constituent unit, it is preferable that Y be a fluorene ring structure formed by $R^{11}$ and $R^{12}$ being bonded to each other.

It is preferable that the polycarbonate constituent unit include at least one represented by the following formula (3).

(3)

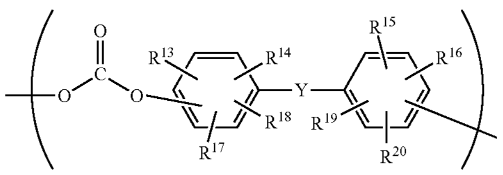

In formula (3), preferred options for $R^{13}$ to $R^{20}$ are the same as for $R^3$ to $R^{10}$ in the above formulas (3-1) to (3-2).

Examples of the above-mentioned substituent for $R^{13}$ to $R^{20}$ include a hydroxyl group, a halogen, an amino group, a vinyl group, a carboxyl group, a cyano group, a (meth) acryloxy group, a glycidyloxy group, and a mercapto group.

In formula (3), Y is the same as Y in the above formulas (3-1) to (3-2).

[(II) Properties of Polysiloxane]

The weight average molecular weight of the polysiloxane is preferably 10,000 to 300,000, more preferably 10,000 to 200,000, still more preferably 10,000 to 100,000, and for example, it is more preferably 20,000 to 80,000, still more preferably 30,000 to 70,000, and particularly preferably 40,000 to 65,000.

In the polysiloxane, it is preferable that the number of moles of the siloxane constituent unit be 1 to 1000. Also, when the polycarbonate constituent unit is included, it is preferable that its number of moles be 1 to 1000. Note that these numbers of moles are both the number of constituent units included in one molecule of the polysiloxane compound, and are each more preferably 10 to 800, and still more preferably 100 to 600.

It is preferable that the proportion that the siloxane constituent unit accounts for in the total number of moles of the siloxane constituent unit and polycarbonate constituent unit in the polysiloxane be 2.0% or more and 90% or less. The above-mentioned proportion of the siloxane constituent unit is more preferably 3.0% or more, such as higher than 3.1% and 90% or less, still more preferably 5% or more and 90% or less, and particularly preferably 8% or more and 90% or less.

Also, when the polysiloxane is not used alone as it is, but mixed with other resins for use as a composition, for example, it may be good to significantly increase the above-mentioned proportion of the siloxane constituent unit. For example, a polysiloxane in which the above-mentioned proportion of the siloxane constituent unit is 30% or more, 50% or more, or 70% or more and the Si content is high can realize a resin with excellent performance, such as high impact resistance and flowability, by being mixed with a polymer without Si or siloxane constituent units, as will be mentioned in detail later. In addition, as described above, when an application for which the proportion of the siloxane constituent unit is increased is preferable, the upper limit value of the above-mentioned proportion of the siloxane constituent unit is not limited to 90%, and it may be, for example, 92%, 95%, 98%, or the like.

In the polysiloxane compound, it is preferable that the molar ratio between the siloxane constituent unit and the polycarbonate constituent unit (that is, the ratio of the number of moles of the siloxane constituent unit:the number of moles of the polycarbonate constituent unit) be 0.01:99.99 to 99.99:0.01. The above-mentioned molar ratio is more preferably 0.1:99.9 to 99.9:0.1, and still more preferably 30:70 to 99.9:0.01, but it may be in another range, such as 1:99 to 99:1 or 10:90 to 90:10.

In the polysiloxane, it is preferable that the Q value (melt flow volume per unit time measured at 280 °C and 160 kg load, $\times 10^{-2}$ $cm^3s^{-1}$) be 8 ($\times 10^{-2}$ $cm^3s^{-1}$) or more. The Q value is more preferably 20 ($\times 10^{-2}$ $cm^3s^{-1}$) or more, still more preferably 40 ($\times 10^{-2}$ $cm^3s^{-1}$) or more, and particularly preferably 60 ($\times 10^{-2}$ $cm^3s^{-1}$) or more.

In the polysiloxane, the glass transition temperature (Tg) in accordance with JIS K 7121 is, for example, 40 to 200 °C, preferably 45 to 180 °C, and more preferably 50 to 160 °C.

In the above-mentioned polysiloxane, that is, polysiloxane having at least a siloxane constituent unit represented by any of formula (1-1) to formula (1-4), a low molecular weight compound having a weight average molecular weight of 1,000 or less accounts for preferably 30% by weight or less, more preferably 20% by weight or less, more preferably 10% by weight or less, more preferably 5.0% by weight or less, particularly preferably 1.5% by weight or less, and still more preferably less than 1.0% by weight. Polysiloxanes in which the low molecular weight compound having a weight average molecular weight of 1,000 or less is included in a large amount tend to foul metal molds (molds) with a trace amount of deposits (mold deposits) in a relatively early stage when they are continuously subjected to injection molding or the like for producing discs or complicated and thinner-walled products. In this regard, when the amount of the low molecular weight compound having a weight average molecular weight of 1,000 or less is less than 1.5% by mass in the polysiloxane, the fouling of metal molds can be effectively prevented.

Also, the lower limit value of the content rate of the low molecular weight compound having a weight average molecular weight of 1,000 or less in the polysiloxane is not particularly important, but it is about 0.7% by weight. However, even when the above low molecular weight compound is included at about 0.001% by weight, 0.01% by weight, or 0.1% by weight or more, there is no problem with the properties of the polysiloxane, especially when used in optical applications, while the effect of improved flowability was also confirmed. Therefore, the lower limit value of the content rate of the low molecular weight compound having a weight average molecular weight of 1,000 or less in the polysiloxane may be 0.001% by weight, 0.01% by weight, or 0.1% by weight.

The content rate of the above-mentioned low molecular weight compound in the polysiloxane is a value calculated by summing the contents of several types of low molecular weight compounds, which are impurities, from the ratio of peak area of each component obtained by GPC analysis. That is, as will be mentioned in detail below, the proportion of the low molecular weight compound with a molecular weight of 1,000 or less in the polysiloxane is a value calculated from the ratio of the area of retention time of 20.5 min to 21.5 min/the area of 0 min to 21.5 min under specific GPC analysis conditions.

In the above-mentioned polysiloxane, that is, polysiloxane having at least a siloxane constituent unit represented by any of formula (1-1) to formula (1-4), the total content of cyclic bodies represented by the following formulas (5-1) to (5-3) is preferably 4.0% by weight or less, more preferably 3.0% by weight or less, still more preferably 2.0% by weight or less, and particularly preferably 1.0% by weight or less, based on the entire weight of the polysiloxane.

When the content of these cyclic dimers is in the above-mentioned range, there is no problem with the properties of the polysiloxane, especially when used in optical applications.

In formula (5-1), m represents an integer of 2 to 10, preferably 2 to 5, more preferably 2 or 3, and still more preferably 2.

In formula (5-2), n represents an integer of 2 to 10, preferably 2 to 5, more preferably 2 or 3, and still more preferably 2.

In formula (5-3), the total of the values of m is 1 to 10 and the total of the values of n is 1 to 10. Then, m and n are each preferably 1 to 5, more preferably 1 or 2, and still more preferably 1.

In formula (5-3), still as mentioned above, the arrangement of the constituent unit including the (—OSi($R_1R_2$)

(5-1)

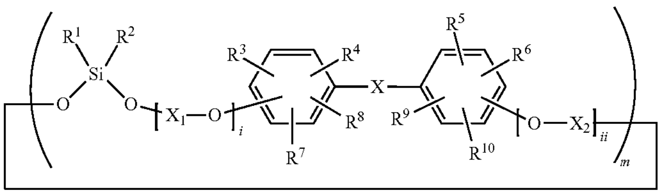

(5-2)

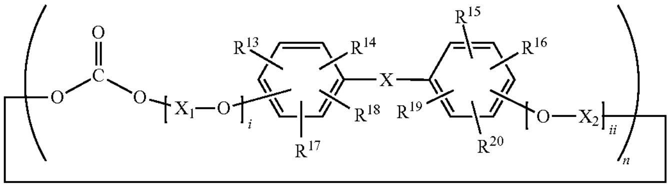

(5-3)

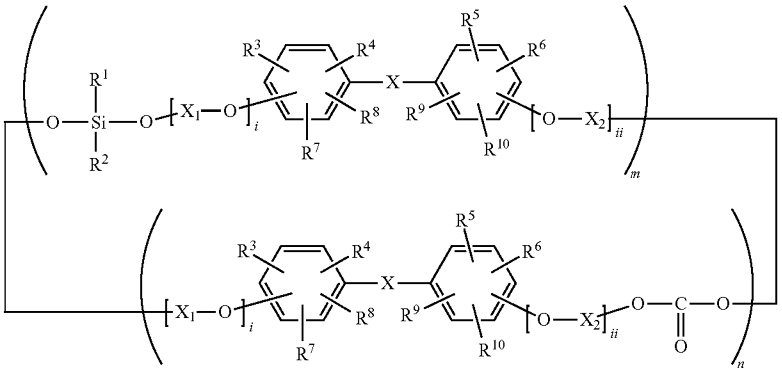

In formulas (5-1) to (5-3), m and n represent the total number of the constituent unit including the (—OSi($R_1R_2$)O—) moiety and the total number of the constituent unit including the (—OC(═O)O—) moiety in each cyclic body, respectively. That is, when the cyclic body of formula (5-1) includes a constituent unit other than the constituent unit including the (—OSi($R_1R_2$)O—) moiety, and when the cyclic body of formula (5-2) includes a constituent unit other than the constituent unit including the (—OC(═O)O—) moiety, m and n each represent the total number of the constituent unit represented by the formula in the cyclic body. In particular, formula (5-3) encompasses a cyclic body in which the constituent unit including the (—OSi($R_1R_2$)O—) moiety is mixed with the constituent unit including the (—OC(═O)O—) moiety, for example, they are arranged alternately, and in this case as well, m and n each represent the total number of the constituent unit represented by the formula in the cyclic body.

O—) moiety and the constituent unit including the (—OC(═O)O—) moiety is arbitrary in the cyclic body of formula (5-3).

In formulas (5-1) to (5-3), $X_1$ and $X_2$ are each independently an alkylene group having 1 to 5 carbon atoms and optionally having a substituent, preferably an alkylene group having 1 to 3 carbon atoms, and more preferably an alkylene group having 1 or 2 carbon atoms.

i and ii each independently represent an integer of 0 or more and 5 or less, preferably an integer of 0 or more and 3 or less, and more preferably 1 or 2.

Also, in formulas (5-1) to (5-3), $R^1$, $R^2$, $R^3$ to $R^{10}$, $R^{13}$ to $R^{20}$, and X are the same as $R^1$, $R^2$, $R^3$ to $R^{10}$, $R^{13}$ to $R^{20}$, and X in formulas (1-1) and (1-2), respectively.

In addition, specific examples of the compounds of formulas (5-1) to (5-3) include cyclic bodies of the following formulas (5-1') to (5-3'), respectively.

(5-1')

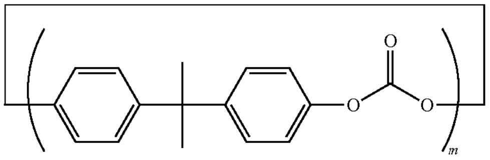

(5-2')

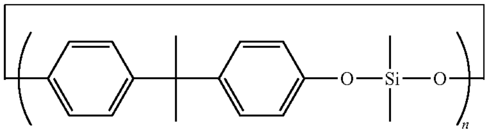

(5-3')

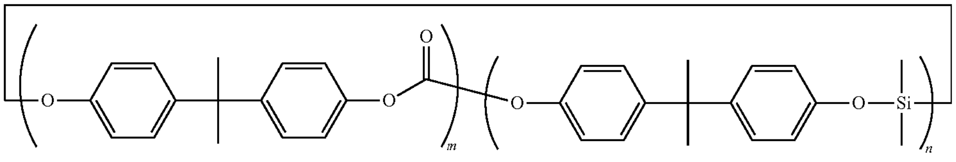

In formula (5-1'), m=2 or 3, preferably m=2; in formula (5-2'), n=2 or 3, preferably n=2; and in formula (5-3'), m=any of 1 to 3, n=any of 1 to 3, preferably both 1 or 2, and more preferably both 1.

Also, in the polysiloxane, the total content of cyclic bodies represented by the following formulas (6-1) and (6-2) can be included. These cyclic bodies are thought to be cyclic dimers resulting from a side reaction of the polymerization reaction for producing the polysiloxane. The total content of these cyclic dimers in the polysiloxane is preferably 2.0% by weight or less, more preferably 1.5% by weight or less, still more preferably 1.0% by weight or less, and particularly preferably 0.5% by weight or less, based on the entire weight of the polysiloxane.

In formulas (6-1) and (6-2), $R^1$, $R^2$, $R^3$ to $R^{10}$, $R^{30}$ to $R^{33}$, and X are the same as those in formulas (1-1) and (1-2).

In formulas (6-1) and (6-2), $X_1$ and $X_2$ are each independently an alkylene group having 1 to 5 carbon atoms and optionally having a substituent, preferably an alkylene group having 1 to 3 carbon atoms, and more preferably an alkylene group having 1 or 2 carbon atoms.

i and ii each independently represent an integer of 0 or more and 5 or less, preferably an integer of 0 or more and 3 or less, and more preferably 1 or 2.

n represents an integer of 2 to 10, preferably an integer of 2 to 5, more preferably 2 or 3, and for example, 2.

(6-1)

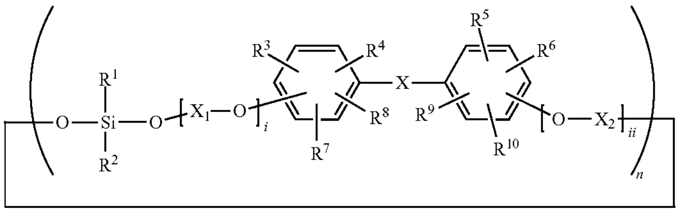

(6-2)

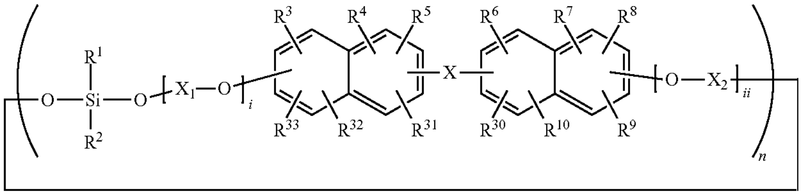

Also, the lower limit value of the total content of the cyclic dimers represented by formulas (6-1) and (6-2) included in the polysiloxane is not particularly limited, and it may be, for example, 0.001% by weight, 0.01% by weight, or 0.1% by weight. The presence of a slight amount of the cyclic dimers can contribute to improvement in flowability of the polysiloxane during molding.

In addition, specific examples of the compounds of formulas (6-1) and (6-2) include cyclic bodies of the following formulas (6-1') and (6-2'), respectively.

In the polysiloxane, the proportion of the total weight of silicon atoms (total Si content) based on the entire weight of the polysiloxane is preferably 0.1 to 20% by mass, more preferably 1.0 to 15% by mass, still more preferably 2.0 to 12% by mass, and particularly preferably 3.0 to 10% by mass (for example, 3.1% by mass or more, or greater than 3.1% by mass and 9.8% by mass or less).

Next, the composition according to the present invention, that is, composition including the above-mentioned polysiloxane and the like, will be described in detail.

(6-1')

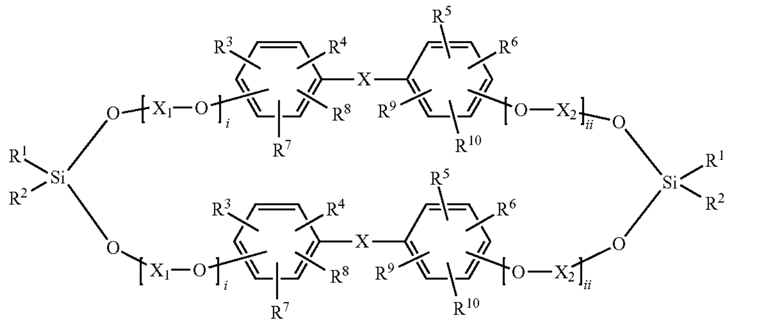

(6-2')

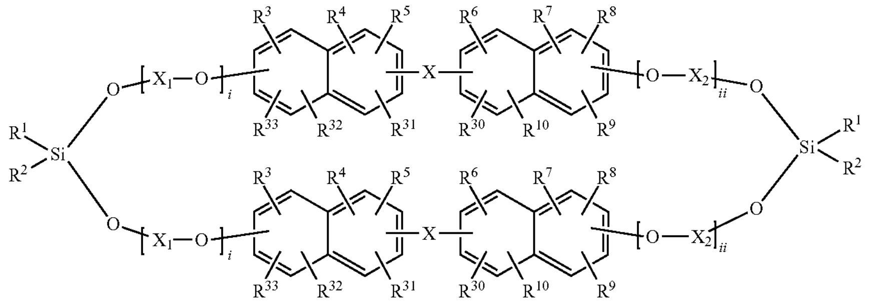

Note that, in formulas (6-1') and (6-2'), $R^1$ and $R^2$, $R^3$ to $R^{10}$, and $R^{30}$ to $R^{33}$, $Z_1$ and $Z_2$, $J_1$, $K_1$, and X are as mentioned above.

The polysiloxane preferably has a 1% mass reduction thermal decomposition temperature of 300 °C or higher, more preferably has a 1% mass reduction thermal decomposition temperature of 320 °C or higher, still more preferably has a 1% mass reduction thermal decomposition temperature of 330 °C or higher, and particularly preferably has a 1% mass reduction thermal decomposition temperature of 350 °C or higher.

In the polysiloxane, the mass reduction proportion at 500 °C as measured by the method whose details will be mentioned later is preferably 40% or less, more preferably 30% or less, still more preferably 25% or less, even more preferably 20% or less, and particularly preferably 17% or less.

That is, the mass retention rate (%) at 500 °C in the polysiloxane, which is the value of 100−"mass reduction proportion at 500 °C. (%)", is preferably 40% or more, more preferably 50% or more or 60% or more, still more preferably 70% or more, still more preferably 75% or more, even more preferably 80% or more, and particularly preferably 83% or more.

Note that details of the mass reduction proportion at 500 °C. (%) and the like will be mentioned later in the Examples section.

<3. Composition>

The composition of the present invention includes the above-mentioned polysiloxane and a polycarbonate resin. Examples of the polycarbonate resin include a polycarbonate resin that is completely or substantially free of siloxane structures.

The composition of the present invention includes the polysiloxane in a proportion of, for example, 50% by weight or more, 60% by weight or more, 70% by weight or more, 80% by weight or more, 90% by weight or more, or 95% by weight or more, based on the entire weight of the composition.

The type of the above-mentioned polycarbonate resin is not particularly limited as long as it includes a —[O—R—OCO]— unit including a carbonate ester bond in the molecular main chain (R is an aliphatic group, aromatic group, or one including both aliphatic and aromatic groups, and also has a linear or branched structure). Also, the polycarbonate resin may include polyester carbonate. Then, as for the polyester carbonate as well, there is no particular limitation as long as it includes a —[O—R—OC]— unit including a carbonate ester bond in the molecular main chain (R is as mentioned above).

The weight average molecular weight of the polycarbonate resin is preferably 10,000 to 100,000, more preferably 13,000 to 80,000, and still more preferably 15,000 to 60,000.

The composition of the present invention may include a resin other than the polycarbonate resin, preferably a thermoplastic resin. The type of the thermoplastic resin is not particularly limited, and in addition to the polycarbonate resin and polyester carbonate resin, examples thereof include various resins such as acrylic resin including polymethyl methacrylate (PMMA), polyethylene terephthalate (PET), triacetyl cellulose (TAC), polyethylene naphthalate (PEN), polyimide (PI), cycloolefin copolymer (COC), norbornene-containing resin, polyethersulfone, cellophane, and aromatic polyamide.

In the composition, the proportion of the total weight of silicon atoms (total Si content) based on the entire weight of the composition is preferably 0.1 to 20% by mass, more preferably 0.2 to 15% by mass, and particularly preferably 0.3 to 10% by mass. The proportion of the total Si content in the composition can be adjusted depending on the proportion that the siloxane constituent unit accounts for in the above-mentioned polysiloxane relative to all constituent units, or on the amount of resin mixed with the polycarbonate resin and the Si content.

The Q value in the composition including the polysiloxane measured under conditions of 280 °C and 160 kgf, $Q_1$, is preferably a value of 120% or more (20% or more higher) compared to the Q value obtained by measuring only the polycarbonate resin included in that composition under the same conditions, $Q_2$. The value of $Q_1$ for the entire composition is more preferably more than 130% or more, still more preferably 140% or more, and particularly preferably 150% or more, such as 160% or more, compared to the value of $Q_2$ for the polycarbonate alone.

In addition, in the case of a composition including 5% by mass of the polysiloxane, the Q value measured under conditions of 280 °C and 160 kgf, $Q_1$, is preferably a value of 140% or more (40% or more higher) compared to the Q value obtained by measuring only the polycarbonate resin included in that composition under the same conditions, $Q_2$. The value of $Q_1$ for the entire composition is more preferably more than 150% or more, still more preferably 160% or more, and particularly preferably 170% or more, such as 180% or more, compared to the value of $Q_2$ for the polycarbonate alone.

By using a polysiloxane with a high Si content, a composition with excellent characteristics can be produced. By mixing a polysiloxane or the like with a Si content of, for example, 0.1% by mass or more with a resin that is substantially free of siloxane constituent units, preferably polycarbonate resin, it is possible to achieve both excellent impact resistance and flowability in the resulting composition.

Note that, in the composition including the polysiloxane, a phenolic compound that may be generated as a by-product of the polymerization reaction, as well as the silane-based compound, carbonate compound, and diol compound that remain without undergoing the reaction, may be included. The phenolic compound and DPC, which are impurities, may cause a decrease in strength when made into a molded body, and may also cause odor generation. Therefore, it is preferable for their contents to be kept as low as possible. For this reason, the contents of the phenolic compound, silane-based compound, carbonate compound, and diol compound may be reduced to the extent that they are not detected, but from the viewpoint of productivity, they may be contained in the composition to the extent that they do not impair the effects. In addition, when remaining monomers are contained in a predetermined amount, such as 1 to 1000 ppm by weight, preferably 10 to 900 ppm, and more preferably 20 to 800 ppm, based on the entire weight of the composition, the effect of improved flowability during molding can be obtained and good plasticity can be achieved when the resin is melted.

Next, the molded body according to the present invention, which includes the polysiloxane, will be described.

<4. Molded Body>

The molded body according to the present invention is obtained by molding the above-mentioned polysiloxane, the composition including the polysiloxane, or the like. The molding method for the molded body is not particularly limited, and examples of the molded body include an injection molded product, a press molded product, a blow molded product, an extrusion molded product, a vacuum molded product, and a pressure molded product.

Also, the optical lens, molded body, according to the present invention is obtained by molding the polysiloxane of the present invention, the composition including the polysiloxane, or the like. The polysiloxane of the present invention is suited for optical applications, and the optical lens of the present invention has a refractive index, Abbe number, and the like in a range suited for use as a lens.

<5. Secondary Component>

Quencher

In the polysiloxane of the present invention, the catalyst may be removed or deactivated after the polymerization reaction is terminated in order to retain thermal stability and hydrolytic stability. A method for deactivating the catalyst by addition of a known acidic substance can be suitably performed. As the acidic substance, specifically, esters such as butyl benzoate, aromatic sulfonic acids such as p-toluenesulfonic acid; aromatic sulfonate esters such as butyl p-toluenesulfonate and hexyl p-toluenesulfonate; phosphoric acids such as phosphorous acid, phosphoric acid, and phosphonic acid; phosphite esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphate esters such as triphenyl phosphate, diphenyl phosphate, monophenyl phosphate, dibutyl phosphate, dioctyl phosphate, and monooctyl phosphate; phosphonic acids such as diphenylphosphonic acid, dioctylphosphonic acid, and dibutylphosphonic acid; phosphonate esters such as diethyl phenylphosphonate; phosphines such as triphenylphosphine and bis(diphenylphosphino)ethane; boric acids such as boric acid and phenylboric acid; aromatic sulfonate salts such as tetrabutylphosphonium dodecylbenzenesulfonate salt; organic halides such as stearoyl chloride, benzoyl chloride, and p-toluenesulfonyl chloride; alkylsulfuric acids such as dimethylsulfuric acid; organic halides such as benzyl chloride; and the like are suitably used. These quenchers may be used in a molar amount of 0.001 to 50 times, preferably 0.01 to 30 times, with respect to the amount of the catalyst, for example.

Additive

<Stabilizer>

To the polysiloxane of the present invention, a stabilizer may be added. As the stabilizer, a thermal stabilizer and an antioxidant are exemplified. When compounded, the proportion of the stabilizer to be added is preferably 0.001 parts by mass or more, more preferably 0.01 parts by mass or more, and still more preferably 0.02 parts by mass or more, and also preferably 2 parts by mass or less, more preferably 1.4 parts by mass or less, and still more preferably 1.0 parts by mass or less, with respect to 100 parts by mass of the polysiloxane compound. Only one type of stabilizer may be included, or two or more types of stabilizers may be included. When two or more types are included, it is preferable that the total amount be in the above range.

<<Thermal Stabilizer>>

Examples of the thermal stabilizer may include a phenolic thermal stabilizer, a phosphorus-based thermal stabilizer, and a sulfur-based thermal stabilizer. Specific examples thereof may include oxoacids of phosphorus such as phosphoric acid, phosphonic acid, phosphorous acid, phosphinic acid, and polyphosphoric acid; acid pyrophosphate metal salts such as sodium acid pyrophosphate, potassium acid pyrophosphate, and calcium acid pyrophosphate; phosphate salts of Group 1 or Group 10 metals such as potassium phosphate, sodium phosphate, cesium phosphate, and zinc phosphate; and organic phosphate compounds, organic phosphite compounds, and organic phosphonite compounds. Examples thereof may also include at least one selected from the group of (a) phosphite ester compound in which at least one ester in the molecule is esterified with phenol and/or phenol having at least one alkyl group having 1 to 25 carbon atoms, (b) phosphorous acid, and (c) tetrakis(2,4-di-tert-butylphenyl)-4,4'-biphenylene-di-phosphonite. Specific examples of the (a) phosphite ester compound may include trioctyl phosphite, trioctadecyl phosphite, tridecyl phosphite, trilauryl phosphite, tristearyl phosphite, triphenyl phosphite, tris(monononylphenyl) phosphite, tris(mononon-onyl/dinonyl-phenyl) phosphite, trisnonylphenyl phosphite, tris(octylphenyl) phosphite, tris(2,4-di-tert-butylphenyl) phosphite, trinonyl phosphite, didecylmonophenyl phosphite, dioctylmonophenyl phosphite, diisopropylmonophenyl phosphite, monobutyldiphenyl phosphite, monodecyldiphenyl phosphite, bis(2,4-di-tert-butylphenyl) pentaerythritol phosphite, bis(2,6-di-tert-butyl-4-methylphenyl)pentaerythritol phosphite, monooctyldiphenyl phosphite, distearylpentaerythritol diphosphite, tricyclohexyl phosphite, diphenylpentaerythritol diphosphite, bis(2,6-di-tert-butyl-4-methylphenyl)pentaerythritol diphosphite, 2,2-methylene bis(4,6-di-tert-butylphenyl)octyl phosphite, bis(nonylphenyl) pentaerythritol diphosphite, bis(2,4-di-tert-butylphenyl) pentaerythritol diphosphite, and bis(2,6-di-tert-butyl-4-ethylphenyl)pentaerythritol diphosphite. They may be used alone, or two or more types may be mixed for use.

Examples of the organic phosphite compound may include “ADK STAB 1178 (trade name, hereinafter the same),” “ADK STAB 2112,” and “ADK STAB HP-10” manufactured by ADEKA CORPORATION, “JP-351,” “JP-360,” and “JP-3CP” manufactured by Johoku Chemical Co., Ltd., and “Irgafos 168” manufactured by BASF SE.

Also, examples of the phosphate ester may include trimethyl phosphate, triethyl phosphate, tributyl phosphate, trioctyl phosphate, triphenyl phosphate, tricresyl phosphate, tris(nonylphenyl) phosphate, and 2-ethylphenyldiphenyl phosphate.

When compounded, the proportion of the thermal stabilizer to be added is preferably 0.001 parts by mass or more, more preferably 0.01 parts by mass or more, and still more preferably 0.03 parts by mass or more, and also preferably 1 part by mass or less, more preferably 0.7 parts by mass or less, and still more preferably 0.5 parts by mass or less, with respect to 100 parts by mass of the polysiloxane compound.

Only one type of thermal stabilizer may be included, or two or more types of thermal stabilizers may be included. When two or more types are included, it is preferable that the total amount be in the above range.

<<Antioxidant>>

Examples of the antioxidant may include a phenolic antioxidant, a hindered phenolic antioxidant, a bisphenolic antioxidant, and a polyphenolic antioxidant. Specific examples thereof may include 2,6-di-tert-butyl-4-methylphenol, tris(3,5-di-tert-butyl-4-hydroxybenzyl) isocyanurate, n-octadecyl-3-(3',5'-di-tert-butyl-4'-hydroxyphenyl) propionate, tetrakis[methylene-3-(3,5-di-tert-butyl-4-hydroxyphenyl)propionate]methane, 4,4'-butylidene bis-(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], N,N'-hexane-1,6-diyl bis[3-(3,5-di-tert-butyl-4-hydroxyphenylpropionamide)], 2,4-dimethyl-6-(1-methylpentadecyl)phenol, diethyl [[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene bis(oxyethylene) bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazin-2-ylamino)phenol.

Examples of the phenolic antioxidant may include “Irganox 1010” ((R), hereinafter the same) and “Irganox 1076” manufactured by BASF SE, and “ADK STAB AO-50” and “ADK STAB AO-60” manufactured by ADEKA CORPORATION.

When compounded, the proportion of the antioxidant to be added is preferably 0.001 parts by mass or more, more preferably 0.01 parts by mass or more, and also preferably 1 part by mass or less, more preferably 0.5 parts by mass or less, with respect to 100 parts by mass of the polysiloxane compound.

Only one type of antioxidant may be included, or two or more types of antioxidants may be included. When two or more types are included, it is preferable that the total amount be in the above range.

In the polysiloxane compound of the present invention, various additives may be compounded to the extent not departing from the spirit of the present invention. As the additive, at least one additive selected from a flame retardant, a flame retardant auxiliary, an ultraviolet absorber, a mold release agent, and a coloring agent is exemplified, and it is preferable that at least one of a flame retardant and a mold release agent be included.

Also, an antistatic agent, a fluorescent brightening agent, an antifogging agent, a flow improver, a plasticizer, a dispersing agent, an antibacterial agent, and the like may be added as long as the desired various physical properties are not significantly impaired.

<Flame Retardant>

In the polysiloxane compound of the present invention, various additives may be compounded to the extent not departing from the spirit of the present invention. As the flame retardant, an organometallic salt-based flame retardant, phosphorus-based flame retardant, silicone-based flame retardant, or the like may be compounded. As the flame retardant that can be used in the present invention, the flame retardants (flame retardant compositions) described in paragraphs 0085 to 0093 of Japanese Patent Laid-Open No. 2016-183422 are exemplified, the contents of which are incorporated herein by reference.

<Ultraviolet Absorber>

Examples of the ultraviolet absorber may include, in addition to an inorganic ultraviolet absorber such as cerium oxide and zinc oxide, an organic ultraviolet absorber such as a benzotriazole compound, a benzophenone compound, a salicylate compound, a cyanoacrylate compound, a triazine compound, an oxanilide compound, a malonate ester compound, a hindered amine compound, and a phenyl salicylate-based compound. Among these, benzotriazole-based and benzophenone-based organic ultraviolet absorbers are preferable. In particular, specific examples of the benzotriazole compound may include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-5'-tert-octylphenyl)-benzotriazole, 2,2'-methylene bis[4-(1,1,3,3-tetramethylbutyl)-6-(2N-benzotriazol-2-yl)phenol], 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy) phenol, 2,2'-(1,4-phenylene) bis[4H-3,1-benzoxazin-4-one], [(4-methoxyphenyl)-methylene]-propanedioic acid-dimethyl ester, 2-(2H-benzotriazol-2-yl)-p-cresol, 2-(2H-benzotriazol-2-yl)-4,6-bis(1-methyl-1-phenylmethyl)phenol, 2-[5-chloro(2H)-benzotriazol-2-yl]-4-methyl-6-(tert-butyl) phenol, 2,4-di-tert-butyl-6-(5-chlorobenzotriazol-2-yl)phenol, 2-(2H-benzotriazol-2-yl)-4-(1,1,3,3-tetrabutyl)phenol, 2,2'-methylene bis[6-(2H-benzotriazol-2-yl)-4-(1,1,3,3-tetrabutyl)phenol], and [methyl-3-[3-tert-butyl-5-(2H-benzotriazol-2-yl)-4-hydroxyphenyl]propionate-polyethylene glycol] condensation product. Among the above, 2-(2'-hydroxy-5'-tert-octylphenyl)benzotriazole and 2,2'-methylene-bis[4-(1,1,3,3-tetramethylbutyl)-6-(2N-benzotriazol-2-yl)phenol] are preferable. Also, specific examples of the benzophenone-based ultraviolet absorber may include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone, and 2,2',4,4'-tetrahydroxy-benzophenone. In addition, specific examples of the phenyl salicylate-based ultraviolet absorber may include phenyl salicylate and 4-tert-butyl-phenyl salicylate. Furthermore, specific examples of the triazine-based ultraviolet absorber may include 2-(4,6-diphenyl-1,3,5-triazin-2-yl)-5-[(hexyl) oxy]-phenol and 2-[4,6-bis(2,4-dimethylphenyl)-1,3,5-triazin-2-yl]-5-(octyloxy)phenol. Moreover, specific examples of the hindered amine-based ultraviolet absorber include bis(2,2,6,6-tetramethylpiperidin-4-yl) sebacate.

When compounded, the proportion of the ultraviolet absorber to be added is preferably 0.01 parts by mass or more, more preferably 0.1 parts by mass or more, and also preferably 3 parts by mass or less, more preferably 1 part by mass or less, with respect to 100 parts by mass of the polysiloxane compound.

Only one type of ultraviolet absorber may be used, or two or more types of ultraviolet absorbers may be used. When two or more types are used, it is preferable that the total amount be in the above range.

<Mold Release Agent>

Examples of the mold release agent may include a mold release agent such as a carboxylate ester, a polysiloxane compound, and a paraffin wax (polyolefin-based). Specific examples thereof may include at least one compound selected from the group of an aliphatic carboxylic acid, an ester of an aliphatic carboxylic acid and an alcohol, an aliphatic hydrocarbon compound with a number average molecular weight of 200 to 15000, and a polysiloxane-based silicone oil. Examples of the aliphatic carboxylic acid may include a saturated or unsaturated, aliphatic monovalent, divalent, or trivalent carboxylic acid. Here, the aliphatic carboxylic acid encompasses an alicyclic carboxylic acid as well. Among these, the preferred aliphatic carboxylic acid is a monovalent or divalent carboxylic acid having 6 to 36 carbon atoms, and an aliphatic saturated monovalent carboxylic acid having 6 to 36 carbon atoms is still more preferable. Specific examples of the aliphatic carboxylic acid may include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid, and azelaic acid. As the aliphatic carboxylic acid in the ester of an aliphatic carboxylic acid and an alcohol, those that are the same as the above aliphatic carboxylic acids can be used. Meanwhile, examples of the alcohol may include a saturated or unsaturated, monohydric or polyhydric alcohol. These alcohols may have a substituent such as a fluorine atom or an aryl group. Among these, a monohydric or polyhydric, saturated alcohol having 30 or less carbon atoms is preferable, and an aliphatic saturated monohydric alcohol or polyhydric alcohol having 30 or less carbon atoms is still more preferable. Here, the aliphatic compound encompasses an alicyclic compound as well. Specific examples of the alcohol may include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol. Note that the above ester compound may contain the aliphatic carboxylic acid and/or the alcohol as impurities, and may be a mixture of a plurality of compounds. Specific examples of the ester of an aliphatic carboxylic acid and an alcohol may include beeswax (a mixture mainly composed of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate. Examples of the aliphatic hydrocarbon with a number average molecular weight of 200 to 15000 may include liquid paraffin, paraffin wax, microwax, polyethylene wax, Fischer-Tropsch wax, and oligomer of an α-olefin having 3 to 12 carbon atoms. Here, the aliphatic hydrocarbon includes an alicyclic hydrocarbon as well. Also, these hydrocarbon compounds may be partially oxidized. Among these, paraffin wax, polyethylene wax, or a partially oxidized product of polyethylene wax is preferable, and paraffin wax and polyethylene wax are still more preferable. The number average molecular weight is preferably 200 to 5000. These aliphatic hydrocarbons may be a single substance, or it may be a mixture of materials with various constituent components and molecular weights, as long as the main component is in the above range. Examples of the polysiloxane-based silicone oil may include dimethyl silicone oil, phenyl methyl silicone oil, diphenyl silicone oil, and fluorinated alkyl silicone. Two or more types of them may be used in combination.

When compounded, the proportion of the mold release agent to be added is preferably 0.001 parts by mass or more, more preferably 0.01 parts by mass or more, and also preferably 2 parts by mass or less, more preferably 1 part by mass or less, with respect to 100 parts by mass of the polysiloxane compound.

Only one type of mold release agent may be used, or two or more types of mold release agents may be used. When two or more types are used, it is preferable that the total amount be in the above range.

<Coloring Agent>

The coloring agent may be either a dye or a pigment, and examples thereof may include an inorganic pigment, an organic pigment, and an organic dye. Examples of the inorganic pigment may include carbon black, a sulfide-based pigment such as cadmium red and cadmium yellow; a silicate salt-based pigment such as ultramarine blue; an oxide-based pigment such as titanium oxide, zinc oxide, red iron oxide, chromium oxide, iron black, titanium yellow, zinc-iron brown, titanium cobalt green, cobalt green, cobalt blue, copper-chromium black, and copper-iron black; a chromic acid-based pigment such as lead yellow and molybdate orange; and a ferrocyanide-based pigment such as iron blue. In addition, examples of the organic pigment and organic dye as the coloring agent may include a phthalocyanine-based dye/pigment ("dye/pigment" refers to a dye or pigment, hereinafter the same) such as copper phthalocyanine blue and copper phthalocyanine green; an azo dye/pigment such as nickel azo yellow; a condensed polycyclic dye/pigment such as thioindigo-based, perinone-based, perylene-based, quinacridone-based, dioxazine-based, isoindolinone-based, and quinophthalone-based dyes/pigments; and quinoline-based, anthraquinone-based, heterocyclic, and methyl dyes/pigments. Then, among these, titanium oxide, carbon black, cyanine-based, quinoline-based, anthraquinone-based, and phthalocyanine-based dyes/pigments, and the like are preferable from the standpoint of thermal stability.

Also, the coloring agent may be masterbatched for use with polystyrene resin, polycarbonate resin, or acrylic resin for the purpose of improving handling properties during extrusion and improving dispersibility in the resin composition.

When compounded, the proportion of the coloring agent to be added is preferably 5 parts by mass or less, more preferably 3 parts by mass or less, and still more preferably 2 parts by mass or less, and also 0.1 parts by mass or more, with respect to 100 parts by mass of the polysiloxane compound. Only one type of coloring agent may be used, or two or more types of coloring agents may be used. When two or more types are used, it is preferable that the total amount be in the above range.

<6. Molded Body Other than Lens>

There is no restriction on the shape, pattern, color, dimensions, and other properties of the molded body obtained using the polysiloxane compound, and they can be arbitrarily set depending on its application. Specific examples of the molded body may include electrical and electronic equipment, office automation (OA) equipment, information terminal equipment, machine parts, home appliances, vehicle parts, construction members, various containers, leisure goods and sundries, parts of lighting equipment and the like, parts of various household electrical products and the like, housings, containers, covers, storage parts, and cases of electrical appliances, and covers and cases of lighting appliances. Examples of the electrical and electronic equipment may include personal computers, game machines, television receivers, display devices such as liquid crystal displays and plasma displays, printers, copiers, scanners, fax machines, electronic notebooks and personal digital assistants (PDAs), electronic desk calculators, electronic dictionaries, cameras, video cameras, cellular phones, battery packs, recording medium drives and reading devices, mice, numeric keypads, CD (Compact Disc) players, MD (MiniDisc) players, and portable radio and audio players. Examples of the molded product may also include electric signboards, liquid crystal backlights, lighting displays, traffic signs, sign boards, screens, automotive parts (in-vehicle parts) such as reflecting plates and meter parts, toys, and decorative items.

The polysiloxane compound of the present application has excellent impact resistance, high flowability when melted, and can be a molded body having a microstructure, and therefore, it can be suitably used as in-vehicle electrical and electronic parts, machine parts, and vehicle parts. Examples of such parts include automotive interior panels, automotive lamp lenses, automotive inner lenses, automotive lens protection covers, and automotive light guides.

<7. Molding Method for Molded Body>

The method for producing the molded body of the present invention is not particularly limited, and any molding method generally employed for resins can be employed. Examples thereof may include injection molding method, ultra high-speed injection molding method, injection compression molding method, two-color molding method, hollow molding method such as gas-assisted molding, molding method using insulated metal mold, molding method using rapid heating metal mold, foam molding (including supercritical fluid), insert molding, IMC (in-mold coating molding) molding method, extrusion molding method, sheet molding method, thermoforming method, rotational molding method, laminate molding method, and press molding method. Also, the molding method using the hot runner system can be used.

<8. Other Resins>

The polysiloxane compound of the present invention may include components other than the polysiloxane compound of the present invention, such as resins other than the polysiloxane compound of the present invention, if necessary, as long as the desired various physical properties are not significantly impaired.

Examples of such other resins may include thermoplastic polyester resin other than the polysiloxane compound of the present invention, such as polycarbonate resin, polyethylene terephthalate resin (PET resin), polytrimethylene terephthalate resin (PTT resin), and polybutylene terephthalate resin (PBT resin); styrene resin such as polystyrene resin (PS resin), high impact polystyrene resin (HIPS), acrylonitrile-styrene copolymer (AS resin), and methyl methacrylate-styrene copolymer (MS resin); core/shell type elastomer such as methyl methacrylate-acrylic rubber-styrene copolymer (MAS), elastomer such as polyester elastomer; polyolefin resin such as cyclic cycloolefin resin (COP resin) and cyclic cycloolefin (COP) copolymer resin; polyamide resin (PA resin); polyimide resin (PI resin); polyetherimide resin (PEI resin); polyurethane resin (PU resin); polyphenylene ether resin (PPE resin); polyphenylene sulfide resin (PPS resin); polysulfone resin (PSU resin); polymethacrylate resin (PMMA resin); and polycaprolactone.

The components other than the polysiloxane in the polysiloxane compound of the present invention are included in a proportion of, for example, 10% by weight or less, 5% by weight or less, 3% by weight or more, 2% by weight or less, or 1% by weight or less, based on the entire weight of the polysiloxane compound.

EXAMPLES

Hereinafter, the present invention will be described more specifically by presenting Examples. However, the present invention is not limited to the following Examples, and may be arbitrarily modified and implemented to the extent that it does not depart from the gist of the present invention.

Example 1

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 10.0 μmol/mol of tetraphenylphosphonium tetraphenylborate as a catalyst (the catalyst amount is the relative number of moles to 2,2-bis(4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 g/mL solution, which was analyzed and quantified by GC/FID, showing that the phenol conversion rate after 10 minutes was 34%, the phenol conversion rate after 20 minutes was 50%, and the phenol conversion rate after 30 minutes was 54%.

Example 2

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 10.0 μmol/mol of tetraphenylphosphonium phenoxide as a catalyst (the catalyst amount is the relative number of moles to 2,2-bis (4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 g/mL solution, which was analyzed and quantified by GC/FID, showing that the phenol conversion rate after 10 minutes was 30%, the phenol conversion rate after 20 minutes was 46%, and the phenol conversion rate after 30 minutes was 52%.

Example 3

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 3.0 μmol/mol of tetraphenylphosphonium tetraphenylborate as a catalyst (the catalyst amount is the relative number of moles to 2,2-bis (4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 g/mL solution, which was analyzed and quantified by GC/FID, showing that the phenol conversion rate after 10 minutes was 23%, the phenol conversion rate after 20 minutes was 40%, and the phenol conversion rate after 30 minutes was 52%.

Example 4

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 1.0 μmol/mol of tetraphenylphosphonium phenoxide as a catalyst (the catalyst amount is the relative number of moles to 2,2-bis(4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 μg/mL solution, which was analyzed and quantified by GC/FID, showing that the phenol conversion rate after 10 minutes was 11%, the phenol conversion rate after 20 minutes was 23%, and the phenol conversion rate after 30 minutes was 31%.

Example 5

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 0.5 μmol/mol of tetraphenylphosphonium phenoxide as a catalyst (the catalyst amount is the relative number of moles to 2,2-bis(4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 μg/mL solution, which was analyzed and quantified by GC/FID, showing that the phenol conversion rate after 10 minutes was 7%, the phenol conversion rate after 20 minutes was 14%, and the phenol conversion rate after 30 minutes was 20%.

Comparative Example 1

In a 500 ml four-neck flask equipped with a stirrer, 112.00 g (0.49 mol) of 2,2-bis(4-hydroxyphenyl)propane, 134.25 g (0.55 mol) of dimethyldiphenoxysilane, and 3.0 μmol/mol of sodium bicarbonate as a catalyst (the catalyst amount is the relative number of moles to 2,2-bis(4-hydroxyphenyl)propane) were placed, and the inside of the system was replaced to a nitrogen atmosphere. The raw materials were heated and melted at 180 °C, and the reaction solution was collected 10 minutes, 20 minutes, and 30 minutes after the raw materials were all melted.

The obtained reaction solution was dissolved in chloroform to form a 1,000 μg/mL solution, which was analyzed and quantified by GC/FID, showing that the phenol conversion rate after 10 minutes was 2%, the phenol conversion rate after 20 minutes was 5%, and the phenol conversion rate after 30 minutes was 8%.

The results of each of the above-mentioned Examples and Comparative Example 1 are shown in Table 1 below.

TABLE 1

| | | | | Example 1 | Example 2 | Example 3 | Example 4 | Example 5 | Comparative Example 1 |
|---|---|---|---|---|---|---|---|---|---|
| Raw materials | Aromatic diol compound (BPA: 2,2-bis(4-hydroxyphenyl)propane) | | g | 112.00 | 112.00 | 112.00 | 112.00 | 112.00 | 112.00 |
| | | | mol (molar amount) | 0.49 | 0.49 | 0.49 | 0.49 | 0.49 | 0.49 |
| | Diphenoxysilane compound (DMDPS: dimethyldiphenoxysilane) | | g | 134.25 | 134.25 | 134.25 | 134.25 | 134.25 | 134.25 |
| | | | mol (molar amount) | 0.55 | 0.55 | 0.55 | 0.55 | 0.55 | 0.55 |
| | Molar ratio (DMDPS/BPA) | | mol/mol | 1.12 | 1.12 | 1.12 | 1.12 | 1.12 | 1.12 |
| | Catalyst | TPPP (tetraphenylphosphonium phenoxide) | μmol/mol (*) | 0 | 10 | 0 | 1 | 0.5 | 0 |
| | | TPTB (tetraphenylphosphonium tetraphenylborate) | | 10 | 0 | 3 | 0 | 0 | 0 |
| | | $NaHCO_3$ | | 0 | 0 | 0 | 0 | 0 | 3 |
| Reaction conditions | Reaction temperature | | (°C) | 180 | 180 | 180 | 180 | 180 | 180 |
| Phenol conversion rate (%) | After 10 minutes | | (%) | 34 | 30 | 23 | 11 | 7 | 2 |
| | After 20 minutes | | (%) | 50 | 46 | 40 | 23 | 14 | 5 |
| | After 30 minutes | | (%) | 54 | 52 | 52 | 31 | 20 | 8 |

(*) Number of moles of catalyst per 1 mol of aromatic diol compound (μmol)

Example 6

In a 300 ml four-neck flask equipped with a stirrer, 80.13 g (0.35 mol) of 2,2-bis(4-hydroxyphenyl)propane, 64.30 g (0.26 mol) of dimethyldiphenoxysilane, 25.98 g (0.12 mol) of diphenyl carbonate, and 10.0 μmol/mol of tetraphenylphosphonium tetraphenylborate as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 2 hours while phenol distilled from the reaction system was condensed and removed with a condenser tube, and the inside of the system was kept at 260 °C with a pressure reduction degree of 2 hPa or less for further 1 hour to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 38,352.

For the thermal decomposition temperature, the 1% weight reduction was 363 °C and the mass retention rate at 500 °C was 65%.

Example 7

In a 300 ml four-neck flask equipped with a stirrer, 80.13 g (0.35 mol) of 2,2-bis(4-hydroxyphenyl)propane, 60.40 g (0.25 mol) of dimethyldiphenoxysilane, 25.98 g (0.12 mol) of diphenyl carbonate, and 10.0 μmol/mol of tetraphenylphosphonium tetraphenylborate as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 1 hour and 30 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 44,030.

For the thermal decomposition temperature, the 1% weight reduction was 361 °C and the mass retention rate at 500 °C was 61%.

Example 8

In a 300 ml four-neck flask equipped with a stirrer, 80.13 g (0.35 mol) of 2,2-bis(4-hydroxyphenyl)propane, 60.40 g (0.25 mol) of dimethyldiphenoxysilane, 25.98 g (0.12 mol) of diphenyl carbonate, and 10.0 μmol/mol of tetraphenylphosphonium phenoxide as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 1 hour and 30 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 46,356.

For the thermal decomposition temperature, the 1% weight reduction was 361 °C and the mass retention rate at 500 °C was 52%.

Example 9

In a 300 ml four-neck flask equipped with a stirrer, 80.13 g (0.35 mol) of 2,2-bis(4-hydroxyphenyl)propane, 63.00 g (0.26 mol) of dimethyldiphenoxysilane, 25.98 g (0.12 mol) of diphenyl carbonate, and 3.0 μmol/mol of tetraphenylphosphonium phenoxide as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 1 hour and 45 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 43,719.

For the thermal decomposition temperature, the 1% weight reduction was 359 °C and the mass retention rate at 500 °C was 66%.

Example 10

In a 300 ml four-neck flask equipped with a stirrer, 80.13 g (0.35 mol) of 2,2-bis(4-hydroxyphenyl)propane, 64.30 g (0.26 mol) of dimethyldiphenoxysilane, 25.98 g (0.12 mol) of diphenyl carbonate, and 1.0 μmol/mol of tetraphenylphosphonium phenoxide (the catalyst amount is the relative number of moles to 2,2-bis(4-hydroxyphenyl)propane) and 1.0 μmol/mol of sodium bicarbonate (the catalyst amount is the relative number of moles to 2,2-bis(4-hydroxyphenyl) propane) as catalysts were placed, and the inside of the system was replaced to a nitrogen atmosphere. The raw materials were heated and melted at 190 °C, and stirred for 20 minutes.

The transesterification reaction was then carried out over 2 hours and 15 minutes while phenol distilled from the reaction system was condensed and removed with a condenser tube, and the inside of the system was kept at 260 °C with a pressure reduction degree of 2 hPa or less for further 1 hour and 45 minutes to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 44,081.

For the thermal decomposition temperature, the 1% weight reduction was 349 °C and the mass retention rate at 500 °C was 54%.

Example 11

In a 300 ml four-neck flask equipped with a stirrer, 80.13 g (0.35 mol) of 2,2-bis(4-hydroxyphenyl)propane, 64.30 g (0.26 mol) of dimethyldiphenoxysilane, 25.98 g (0.12 mol) of diphenyl carbonate, and 0.5 μmol/mol of tetraphenylphosphonium phenoxide (the catalyst amount is the relative number of moles to 2,2-bis(4-hydroxyphenyl)propane) and 1.0 μmol/mol of sodium bicarbonate (the catalyst amount is the relative number of moles to 2,2-bis(4-hydroxyphenyl) propane) as catalysts were placed, and the inside of the system was replaced to a nitrogen atmosphere. The raw materials were heated and melted at 190 °C, and stirred for 20 minutes.

The transesterification reaction was then carried out over 2 hours and 45 minutes while phenol distilled from the reaction system was condensed and removed with a condenser tube, and the inside of the system was kept at 260 °C with a pressure reduction degree of 2 hPa or less for further 2 hours and 40 minutes to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 47,535.

For the thermal decomposition temperature, the 1% weight reduction was 347 °C and the mass retention rate at 500 °C was 58%.

Example 12

In a 300 ml four-neck flask equipped with a stirrer, 80.13 g (0.35 mol) of 2,2-bis(4-hydroxyphenyl)propane, 63.41 g (0.26 mol) of dimethyldiphenoxysilane, 25.62 g (0.12 mol) of diphenyl carbonate, and 6.0 μmol/mol of tetraphenylphosphonium phenoxide (the catalyst amount is the relative number of moles to 2,2-bis(4-hydroxyphenyl)propane) and 1.5 μmol/mol of sodium bicarbonate (the catalyst amount is the relative number of moles to 2,2-bis(4-hydroxyphenyl) propane) as catalysts were placed, and the inside of the system was replaced to a nitrogen atmosphere. The raw materials were heated and melted at 190 °C, and stirred for 20 minutes.

The transesterification reaction was then carried out over 1 hour and 30 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 44,949.

For the thermal decomposition temperature, the 1% weight reduction was 359 °C and the mass retention rate at 500 °C was 47%.

Example 13

In a 300 ml four-neck flask equipped with a stirrer, 80.13 g (0.35 mol) of 2,2-bis(4-hydroxyphenyl)propane, 61.66 g (0.25 mol) of dimethyldiphenoxysilane, 24.90 g (0.12 mol) of diphenyl carbonate, and 10.0 μmol/mol of tetraphenylphosphonium phenoxide (the catalyst amount is the relative number of moles to 2,2-bis(4-hydroxyphenyl)propane) and 14 μmol/mol of sodium acetate (the catalyst amount is the relative number of moles to 2,2-bis(4-hydroxyphenyl) propane) as catalysts were placed, and the inside of the system was replaced to a nitrogen atmosphere. The raw materials were heated and melted at 190 °C, and stirred for 20 minutes.

The transesterification reaction was then carried out over 1 hour and 48 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 63,619.

For the thermal decomposition temperature, the 1% weight reduction was 353 °C and the mass retention rate at 500 °C was 60%.

Example 14

In a 300 ml four-neck flask equipped with a stirrer, 80.13 g (0.35 mol) of 2,2-bis(4-hydroxyphenyl)propane, 61.66 g (0.25 mol) of dimethyldiphenoxysilane, 24.90 g (0.12 mol) of diphenyl carbonate, and 10.0 μmol/mol of tetraphenylphosphonium phenoxide (the catalyst amount is the relative number of moles to 2,2-bis(4-hydroxyphenyl)propane) and 26 μmol/mol of sodium benzoate (the catalyst amount is the relative number of moles to 2,2-bis(4-hydroxyphenyl) propane) as catalysts were placed, and the inside of the system was replaced to a nitrogen atmosphere. The raw materials were heated and melted at 190 °C, and stirred for 20 minutes.

The transesterification reaction was then carried out over 1 hour and 43 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 63,619.

For the thermal decomposition temperature, the 1% weight reduction was 349 °C and the mass retention rate at 500 °C was 59%.

Example 15

In a 300 ml four-neck flask equipped with a stirrer, 80.13 g (0.35 mol) of 2,2-bis(4-hydroxyphenyl)propane, 63.41 g (0.26 mol) of dimethyldiphenoxysilane, 25.62 g (0.12 mol) of diphenyl carbonate, and 3.0 μmol/mol of tetraphenylphosphonium phenoxide (the catalyst amount is the relative number of moles to 2,2-bis(4-hydroxyphenyl)propane) and 6 μmol/mol of sodium acetate (the catalyst amount is the relative number of moles to 2,2-bis(4-hydroxyphenyl)propane) as catalysts were placed, and the inside of the system was replaced to a nitrogen atmosphere. The raw materials were heated and melted at 190 °C, and stirred for 20 minutes.

The transesterification reaction was then carried out over 1 hour and 52 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 63,619.

For the thermal decomposition temperature, the 1% weight reduction was 351 °C and the mass retention rate at 500 °C was 66%.

Comparative Example 2

In a 300 ml four-neck flask equipped with a stirrer, 80.13 g (0.35 mol) of 2,2-bis(4-hydroxyphenyl)propane, 67.30 g (0.28 mol) of dimethyldiphenoxysilane, 25.98 g (0.12 mol) of diphenyl carbonate, and 3.0 μmol/mol of sodium bicarbonate as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 2 hours and 40 minutes while phenol distilled from the reaction system was condensed and removed with a condenser tube, and the inside of the system was kept at 260 °C with a pressure reduction degree of 2 hPa or less for further 2 hours and 30 minutes to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 56,695.

For the thermal decomposition temperature, the 1% weight reduction was 359 °C and the mass retention rate at 500 °C was 66%.

Comparative Example 3

In a 300 ml four-neck flask equipped with a stirrer, 80.13 g (0.35 mol) of 2,2-bis(4-hydroxyphenyl)propane, 64.30 g (0.28 mol) of dimethyldiphenoxysilane, 25.98 g (0.12 mol) of diphenyl carbonate, and 1.5 μmol/mol of sodium bicarbonate as a catalyst (the catalyst amount is the relative number of moles to 2,2-bis(4-hydroxyphenyl)propane) were placed, and the inside of the system was replaced to a nitrogen atmosphere. The raw materials were heated and melted at 190 °C, and stirred for 20 minutes.

The transesterification reaction was then carried out over 3 hours and 20 minutes while phenol distilled from the reaction system was condensed and removed with a condenser tube, and the inside of the system was kept at 260 °C with a pressure reduction degree of 2 hPa or less for further 2 hours to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC and was 37,590.

For the thermal decomposition temperature, the 1% weight reduction was 365 °C and the mass retention rate at 500 °C was 62%.

The results of each of the above-mentioned Examples and Comparative Examples 2 and 3 are shown in Table 2 below.

TABLE 2

| | | | | Example 6 | Example 7 | Example 8 | Example 9 | Example 10 |
|---|---|---|---|---|---|---|---|---|
| | Aromatic diol compound (BPA: 2,2-bis(4-hydroxyphenyl)propane) | | g | 80.13 | 80.13 | 80.13 | 80.13 | 80.13 |
| | | | mol (molar amount) | 0.35 | 0.35 | 0.35 | 0.35 | 0.35 |
| | Diphenoxysilane compound (DMDPS: dimethyldiphenoxysilane) | | g | 64.30 | 60.40 | 60.40 | 63.00 | 64.30 |
| | | | mol (molar amount) | 0.26 | 0.25 | 0.25 | 0.26 | 0.26 |
| | Diaryl carbonate (DPC: diphenyl carbonate) | | g | 25.98 | 25.98 | 25.98 | 25.98 | 25.98 |
| | | | mol (molar amount) | 0.12 | 0.12 | 0.12 | 0.12 | 0.12 |
| | Molar ratio (diphenoxysilane compound + DPC/BPA) | | mol/mol | 1.095 | 1.050 | 1.050 | 1.080 | 1.095 |
| | Catalyst | TPPP (tetraphenylphosphonium phenoxide) | μmol/mol (Number of moles per 1 mol of aromatic diol compound (μmol)) | 0 | 0 | 10 | 3 | 1 |
| | | TPTB (tetraphenylphosphonium tetraphenylborate) | | 10 | 10 | 0 | 0 | 0 |
| | | $NaHCO_3$ | | 0 | 0 | 0 | 0 | 1 |
| | | $CH_3COONa$ | | 0 | 0 | 0 | 0 | 0 |
| | | PhCOONa | | 0 | 0 | 0 | 0 | 0 |
| Reaction conditions | Final reaction temperature | | (°C) | 260 | 260 | 260 | 260 | 260 |
| | Reaction time | | Total reaction time | 2:51 | 3:34 | 3:41 | 3:45 | 4:00 |
| | | | Before FV (*1) | 1:58 | 1:34 | 1:38 | 1:45 | 2:14 |
| | | | After FV (*2) | 0:53 | 2:00 | 2:03 | 2:00 | 1:46 |
| | Weight average molecular weight | | Mw (g/mol) | 38,352 | 44,030 | 46,356 | 43,719 | 44,081 |
| Thermal decomposition temperature | 1% Thermal mass reduction start temperature | | °C | 363 | 361 | 361 | 359 | 349 |
| | Mass retention rate at 500 °C | | % | 65 | 61 | 52 | 66 | 54 |

| | | | | Example 11 | Example 12 | Example 13 | Example 14 |
|---|---|---|---|---|---|---|---|
| | Aromatic diol compound (BPA: 2,2-bis(4-hydroxyphenyl)propane) | | g | 80.33 | 80.13 | 80.13 | 80.13 |
| | | | mol (molar amount) | 0.35 | 0.35 | 0.35 | 0.35 |
| | Diphenoxysilane compound (DMDPS: dimethyldiphenoxysilane) | | g | 64.30 | 63.41 | 61.66 | 61.66 |
| | | | mol (molar amount) | 0.26 | 0.26 | 0.25 | 0.25 |
| | Diaryl carbonate (DPC: diphenyl carbonate) | | g | 25.98 | 25.62 | 24.90 | 24.90 |
| | | | mol (molar amount) | 0.12 | 0.12 | 0.12 | 0.12 |
| | Molar ratio (diphenoxysilane compound + DPC/BPA) | | mol/mol | 1.095 | 1.080 | 1.05 | 1.050 |
| | Catalyst | TPPP (tetraphenylphosphonium phenoxide) | μmol/mol (Number of moles per 1 mol of aromatic diol compound (μmol)) | 0.5 | 6 | 10 | 10 |
| | | TPTB (tetraphenylphosphonium tetraphenylborate) | | 0 | 0 | 0 | 0 |
| | | $NaHCO_3$ | | 1 | 1.5 | 0 | 0 |
| | | $CH_3COONa$ | | 0 | 0 | 14 | 0 |
| | | PhCOONa | | 0 | 0 | 0 | 26 |

TABLE 2-continued

| | | | | | | |
|---|---|---|---|---|---|---|
| Reaction conditions | Final reaction temperature | (°C) | 260 | 260 | 260 | 260 |
| | Reaction time | Total reaction time | 5:23 | 3:39 | 3:48 | 3:43 |
| | | Before FV (*1) | 2:43 | 1:36 | 1:48 | 1:43 |
| | | After FV (*2) | 2:40 | 2:03 | 2:00 | 2:00 |
| | Weight average molecular weight | Mw (g/mol) | 47,535 | 44,949 | 63,619 | 65,416 |
| Thermal decomposition temperature | 1% Thermal mass reduction start temperature | °C | 347 | 359 | 353 | 349 |
| | Mass retention rate at 500 °C | % | 58 | 47 | 60 | 59 |

| | | | | Example 15 | Comparative Example 2 | Comparative Example 3 |
|---|---|---|---|---|---|---|
| | Aromatic diol compound (BPA: 2,2-bis(4-hydroxyphenyl)propane) | | g | 80.13 | 80.13 | 80.13 |
| | | | mol (molar amount) | 0.35 | 0.35 | 0.35 |
| | Diphenoxysilane compound (DMDPS: dimethyldiphenoxysilane) | | g | 63.41 | 67.30 | 64.30 |
| | | | mol (molar amount) | 0.26 | 0.28 | 0.26 |
| | Diaryl carbonate (DPC: diphenyl carbonate) | | g | 25.62 | 25.98 | 25.98 |
| | | | mol (molar amount) | 0.12 | 0.12 | 0.12 |
| | Molar ratio (diphenoxysilane compound + DPC/BPA) | | mol/mol | 1.080 | 1.130 | 1.095 |
| | Catalyst | TPPP (tetraphenylphosphonium phenoxide) | μmol/mol (Number of moles per 1 mol of aromatic diol compound (μmol)) | 3 | 0 | 0 |
| | | TPTB (tetraphenylphosphonium tetraphenylborate) | | 0 | 0 | 0 |
| | | $NaHCO_3$ | | 0 | 3 | 1.5 |
| | | $CH_3COONa$ | | 6 | 0 | 0 |
| | | PhCOONa | | 0 | 0 | 0 |
| Reaction conditions | Final reaction temperature | | (°C) | 260 | 260 | 260 |
| | Reaction time | | Total reaction time | 3:52 | 5:10 | 5:20 |
| | | | Before FV (*1) | 1:52 | 2:40 | 3:20 |
| | | | After FV (*2) | 2:00 | 2:30 | 2:00 |
| | Weight average molecular weight | | Mw (g/mol) | 54,267 | 56,695 | 37,590 |
| Thermal decomposition temperature | 1% Thermal mass reduction start temperature | | °C | 351 | 359 | 365 |
| | Mass retention rate at 500 °C | | % | 66 | 66 | 62 |

(*1) Before FV: reaction time before the pressure reduction degree is brought to 2 hPa or less (time:min)
(*2) After FV: reaction time after the pressure reduction degree is brought to 2 hPa or less (time:min)

Analytical Method

<Measurement of Phenol Conversion Rate>

The method for measuring the phenol conversion rate in each of the Examples and Comparative Examples is as follows.

The samples of Examples or Comparative Examples were dissolved in chloroform to form 1,000 μg/mL solutions, which were analyzed and quantified by GC/FID.

The quantitative value is the value in terms of phenol determined from the standard curve for phenol shown in FIG. 1, which had been created in advance.

From the value in terms of phenol, the amount of phenol produced in the reaction solution was calculated, and the phenol conversion rate (%) was determined from the following calculation expression (A).

(Calculation expression (A))

$$(\text{Amount of phenol produced (g)}/\text{Amount of phenol theoretically produced (g)})\times 100=\text{Phenol conversion rate (\%)} \quad (A)$$

[Measurement Conditions for GC/FID]

The measurement conditions for GC/FID in each of the Examples and Comparative Examples are as follows.

Apparatus: GC2025 manufactured by Shimadzu Corporation

Column: capillary column DB-35, 30 mm×0.25 mm×0.25 μm

Temperature increasing conditions: 40 °C to 300 °C. (5 min hold), 10 °C/min

Inlet temperature: 300 °C, Injection volume: 1.0 μL (split ratio 1:20)

Carrier gas: He

Air flow rate: 400 mL/min $H_2$ flow rate: 40 mL/min

Makeup gas: 30 mL/min

Reference material: phenol

<Thermal Decomposition Temperature>

1%-Thermal mass reduction start temperature and mass reduction proportion at 500 °C.

10 mg of the measurement sample was accurately weighed in an aluminum pan (Al open type sample container φ5.2 H2.5 mm). The measurement was carried out under atmospheric air. 0.00519 g of α-alumina was used as the reference material. The sample temperature was adjusted to 30 °C, increased to 500 °C at 10 °C/min, and the mass reduction temperature by 1% by mass was defined as the "1%-thermal mass reduction start temperature." Also, the proportion of the mass reduction of the sample at 500 °C, which was based on the mass of the sample before heating, was defined as the "mass reduction proportion at 500 °C. (%)." In the table above, the values for "mass retention rate at 500 °C. (%)", that is, 100−"mass reduction proportion at 500 °C. (%)," are shown.

Measurement apparatus: simultaneous thermogravimetric analyzer (TG/DTA) (manufactured by Hitachi High-Tech Science Corporation, TG/DTA 7300)

<Measurement of Weight Average Molecular Weight (Mw) in Terms of Polystyrene>

The standard curve was created using GPC (gel permeation chromatography) with chloroform as the developing solvent and a standard polystyrene (Shodex STANDARD, SM-105) with a known molecular weight (molecular weight distribution=1). From the measured standard polystyrene, the elution time and molecular weight value for each peak were plotted and approximated by a cubic equation to form a calibration curve.

Then, based on the obtained calibration curve, the weight average molecular weight (Mw) was determined as the value in terms of polystyrene from the following expression.

$$Mw=\Sigma(Wi\times Mi)/\Sigma(Wi) \quad \text{[Calculation expression]}$$

(In the above expression, i represents the i-th division point when the molecular weight M is divided, Wi represents the i-th weight, and Mi represents the i-th molecular weight. In addition, the molecular weight M represents the molecular weight in terms of polystyrene at the same elution time of the calibration curve.)

[Measurement Conditions]

Apparatus: LabSolutions manufactured by Shimadzu Corporation

Column: guard column (Shodex GPC K-G 4A)×1, analytical column (Shodex GPC K-805L)×2

Solvent: chloroform (HPLC grade)

Injection volume: 10 μL

Sample concentration: 2000 ppm

Solvent flow rate: 1 mL/min

Measurement temperature: 40 °C.

Detector: RI

The invention claimed is:

1. A method for producing a polysiloxane having a siloxane constituent unit represented by any of the following formula (1-1) to formula (1-4), comprising:

polymerizing a silane-based compound and a diol compound including an aromatic diol compound or an alicyclic diol compound, wherein the silane-based compound is selected from:

a diaryloxysilane compound including at least any of a dialkyldiaryloxysilane, a diaryldiaryloxysilane, and a monoalkylmonoaryldiaryloxysilane;

a dialkoxysilane compound including at least any of a dialkyldialkoxysilane, a diaryldialkoxysilane, and a monoalkylmonoaryldialkoxysilane; and a silicon compound including at least one of a cyclic siloxane compound and a linear siloxane compound, and in the polymerizing, a transesterification catalyst including a phosphorus compound is used:

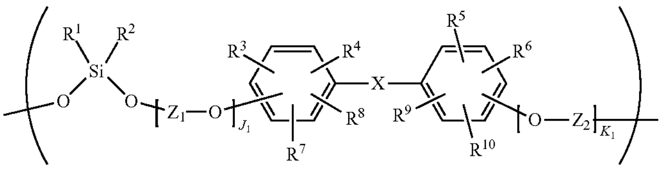

(1-1)

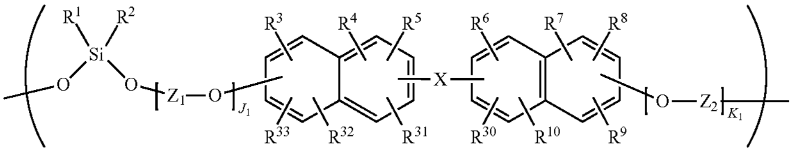

(1-2)

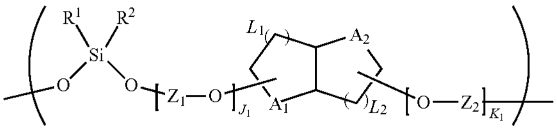

(1-3)

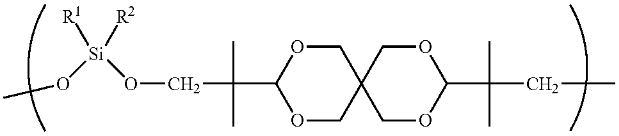

(1-4)

wherein $R^1$ and $R^2$ each independently represent an alkyl group having 1 to 20 carbon atoms in total and optionally having a substituent or an aryl group having 6 to 30 carbon atoms in total and optionally having a substituent;

$R^3$ to $R^{10}$ and $R^{30}$ to $R^{33}$ each independently represent hydrogen, a halogen, an alkoxy, an alkyl group having 1 to 20 carbon atoms in total and optionally having a substituent, an alkenyl group having 2 to 20 carbon atoms in total and optionally having a substituent, or an aryl group having 6 to 30 carbon atoms in total and optionally having a substituent;

$Z_1$ and $Z_2$ are each independently an alkylene group having 1 to 5 carbon atoms in total and optionally having a substituent;

$J_1$ each independently represent an integer of 0 or more and 5 or less;

$K_1$ each independently represent an integer of 0 or more and 5 or less;

$A_1$ and $A_2$ each independently represent any of —O— and —CH—;

$L_1$ and $L_2$ each independently represent an integer of 0 or more and 3 or less;

X is a single bond or any of structural formulas represented by the following formula (2):

(2)

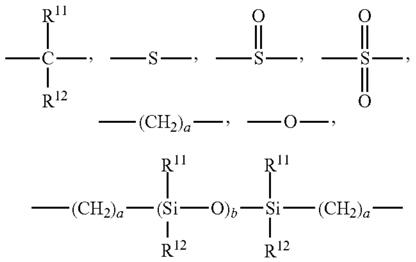

wherein $R^{11}$ and $R^{12}$ each independently represent hydrogen, a halogen, an alkyl group having 1 to 20 carbon atoms in total and optionally having a substituent, or an aryl group having 6 to 30 carbon atoms in total and optionally having a substituent, or $R^{11}$ and $R^{12}$ are bonded to each other to form and represent a carbocycle or heterocycle having 1 to 20 carbon atoms and optionally having a substituent;

the substituent is each independently any of a halogen, a cyano group, an alkenyl group, an alkynyl group, and an alkoxy group; and a and b each independently represent an integer of 0 or 1 or more and 5000 or less;

wherein in the polymerizing, the silane-based compound and the diol compound are polymerized under reduced pressure in a molten state while an alcohol derived from the silane-based compound is removed; and the polysiloxane has a weight average molecular weight (Mw) in terms of polystyrene of greater than 20,000 to 80,000, and wherein, in the polysiloxane, a low molecular weight compound having a weight average molecular weight of 1,000 or less accounts for 5.0% by weight or less.

2. The method for producing a polysiloxane according to claim 1, wherein the phosphorus compound includes a compound represented by the following general formula (I):

$$(PRe_4)^+(Xc)^- \quad (I)$$

wherein Re each independently represents an alkyl group, an aryl group, or an alkylaryl group, and a plurality of Re are optionally bonded to each other to form a ring structure; and Xc represents a hydroxyl group, a halogen atom, an alkyloxy group, an aryloxy group, an alkylcarbonyloxy group, an arylcarbonyloxy group, $HCO_3$, or $BRf_4$, where Rf is each independently a hydrogen atom, an alkyl group, or an aryl group.

3. The method for producing a polysiloxane according to claim 1, wherein the phosphorus compound includes any of biphenyltriphenylphosphonium hydroxide, biphenyltriphenylphosphonium tetraphenylborate, biphenyltriphenylphosphonium phenoxide, biphenyltriphenylphosphonium chloride, tetraphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium phenoxide, tetraphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, methoxyphenyltriphenylphosphonium chloride, phenoxyphenyltriphenylphosphonium chloride, and naphthylphenyltriphenylphosphonium chloride.

4. The method for producing a polysiloxane according to claim 3, wherein the phosphorus compound includes at least any of tetraphenylphosphonium phenoxide and tetraphenylphosphonium tetraphenylborate.

5. The method for producing a polysiloxane according to claim 1, wherein the transesterification catalyst further includes an alkali metal catalyst.

6. The method for producing a polysiloxane according to claim 5, wherein the transesterification catalyst includes an alkali metal-based transesterification catalyst including at least sodium.

7. The method for producing a polysiloxane according to claim 1, wherein, in the polymerizing, an amount of the transesterification catalyst relative to the diol compound is $1.0\times10^{-7}$ to $1.0\times10^{-2}$ in a molar ratio.

8. The method for producing a polysiloxane according to claim 1, wherein a reaction temperature in the polymerizing is in the range of 150 °C or higher and 300 °C or lower.

9. The method for producing a polysiloxane according to claim 1, wherein no solvent is used in the polymerizing.

10. The method for producing a polysiloxane according to claim 1, wherein a ratio of the number of moles of the silane-based compound to the number of moles of the diol compound used in the polymerizing is 0.9 or more and 1.2 or less.

11. The method for producing a polysiloxane according to claim 1, wherein a carbonate compound is further polymerized with the silane-based compound and the diol compound in the polymerizing.

12. The method for producing a polysiloxane according to claim 11, wherein the polysiloxane further has a polycarbonate constituent unit derived from the carbonate compound and represented by any of the following formulas (3-1) to (3-4):

(3-1)

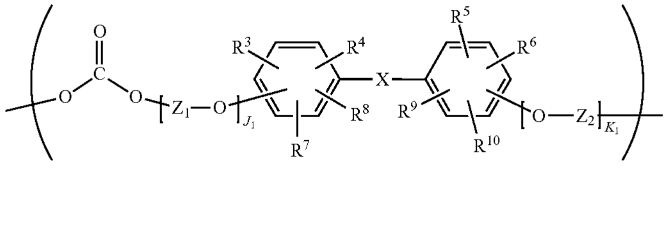

-continued (3-2)

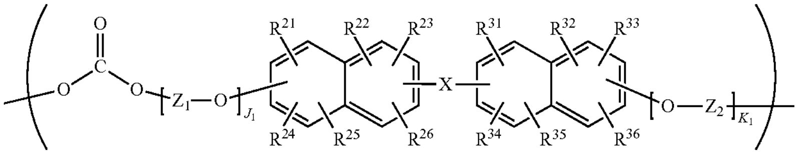

(3-3)

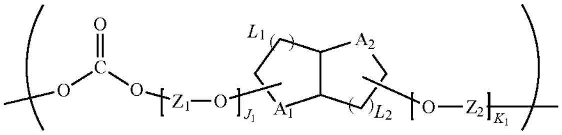

(3-4)

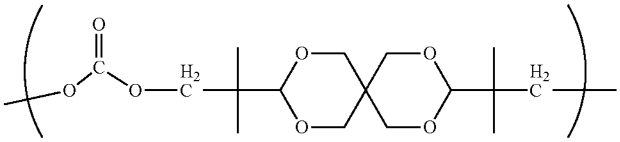

wherein $R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

the substituent is any of a halogen, a cyano group, an alkenyl group, an alkynyl group, and an alkoxy group;

$J_1$ each independently represent an integer of 0 to 5;

$K_1$ each independently represent an integer of 0 to 5;

$A_1$ and $A_2$ each independently represent any of $-O-$ and $-CH_2-$;

$L_1$ and $L_2$ each independently represent an integer of 0 to 3;

X is a single bond, or any of structural formulas represented by the following formulas (1) to (7):

(1)

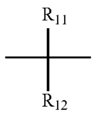

(2)

$$-S-$$

(3)

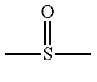

(4)

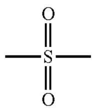

(5)

$$-O-$$

-continued (6)

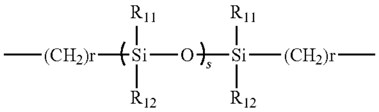

(7)

$$-(CH_2)r-$$

wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

13. The method for producing a polysiloxane according to claim 12, wherein a molar ratio between the siloxane constituent unit in total and the polycarbonate constituent unit in total is 0.1:99.9 to 100:0.

14. A method for producing a polysiloxane, wherein the polysiloxane has a siloxane constituent unit represented by any of the following formula (1-1) to formula (1-4), comprising:

polymerizing a silane-based compound and a diol compound including an aromatic diol compound or an alicyclic diol compound, wherein the silane-based compound is selected from:

a diaryloxysilane compound including at least any of a dialkyldiaryloxysilane, a diaryldiaryloxysilane, and a monoalkylmonoaryldiaryloxysilane;

a dialkoxysilane compound including at least any of a dialkyldialkoxysilane, a diaryldialkoxysilane, and a monoalkylmonoaryldialkoxysilane; and a silicon compound including at least one of a cyclic siloxane compound and a linear siloxane compound, and in the polymerizing, a transesterification catalyst including a phosphorus compound is used:

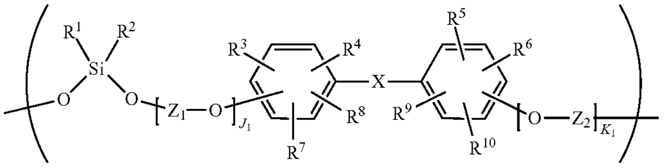

(1-1)

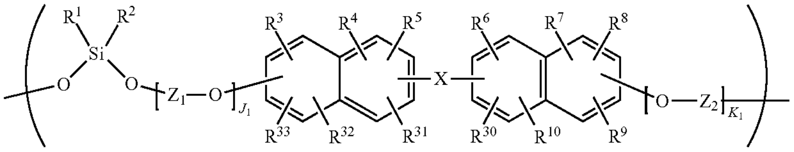

(1-2)

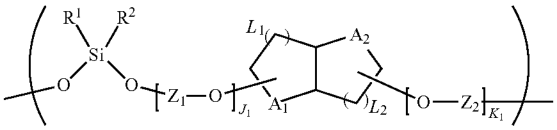

(1-3)

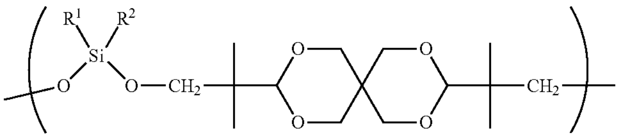

(1-4)

wherein $R^1$ and $R^2$ each independently represent an alkyl group having 1 to 20 carbon atoms in total and optionally having a substituent or an aryl group having 6 to 30 carbon atoms in total and optionally having a substituent;

$R^3$ to $R^{10}$ and $R^{30}$ to $R^{33}$ each independently represent hydrogen, a halogen, an alkoxy, an alkyl group having 1 to 20 carbon atoms in total and optionally having a substituent, an alkenyl group having 2 to 20 carbon atoms in total and optionally having a substituent, or an aryl group having 6 to 30 carbon atoms in total and optionally having a substituent;

$Z_1$ and $Z_2$ are each independently an alkylene group having 1 to 5 carbon atoms in total and optionally having a substituent;

$J_1$ each independently represent an integer of 0 or more and 5 or less;

$K_1$ each independently represent an integer of 0 or more and 5 or less;

$A_1$ and $A_2$ each independently represent any of —O— and —CH—;

$L_1$ and $L_2$ each independently represent an integer of 0 or more and 3 or less;

X is a single bond or any of structural formulas represented by the following formula (2):

(2)

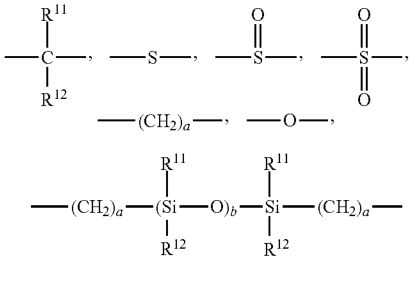

wherein $R^{11}$ and $R^{12}$ each independently represent hydrogen, a halogen, an alkyl group having 1 to 20 carbon atoms in total and optionally having a substituent, or an aryl group having 6 to 30 carbon atoms in total and optionally having a substituent, or $R^{11}$ and $R^{12}$ are bonded to each other to form and represent a carbocycle or heterocycle having 1 to 20 carbon atoms and optionally having a substituent;

the substituent is each independently any of a halogen, a cyano group, an alkenyl group, an alkynyl group, and an alkoxy group; and a and b each independently represent an integer of 0 or 1 or more and 5000 or less;

wherein the polysiloxane consists only of the siloxane constituent unit, and wherein, in the polysiloxane, a low molecular weight compound having a weight average molecular weight of 1,000 or less accounts for 5.0% by weight or less.

15. The method for producing a polysiloxane according to claim 1, wherein the polysiloxane has a weight average molecular weight (Mw) in terms of polystyrene of 30,000 to 65,000.

16. The method for producing a polysiloxane according to claim 1, wherein, in the polysiloxane, a low molecular weight compound having a weight average molecular weight of 1,000 or less accounts for 1% by weight or less.

17. The method for producing a polysiloxane according to claim 16, wherein, in the polysiloxane, a proportion calculated from a GPC area ratio of the low molecular weight compound having a weight average molecular weight of 1,000 or less is 1% by weight or less.

18. The method for producing a polysiloxane according to claim 1, wherein the polysiloxane has a 1% mass reduction thermal decomposition temperature of 300 °C or higher.

19. The method for producing a polysiloxane according to claim 1, wherein the polysiloxane has a mass retention rate at 500 °C of 40% or more.

* * * * *